US012365491B2

United States Patent
Ziegler et al.

(10) Patent No.: US 12,365,491 B2
(45) Date of Patent: Jul. 22, 2025

(54) LOW GRAVITY POWER DISTRIBUTION SYSTEM AND DEVICE

(71) Applicant: SPACE KINETIC CORP, Rio Rancho, NM (US)

(72) Inventors: Scott Ziegler, Rio Rancho, NM (US); Stanley Starr, Orlando, FL (US); Jim Ziegler, Ave Maria, FL (US); Darin Koblick, Rolling Hills Estates, CA (US); Vu Vuong, Oakland, CA (US)

(73) Assignee: Space Kinetic Corp, Rio Rancho, NM (US)

( * ) Notice: Subject to any disclaimer, the term of this patent is extended or adjusted under 35 U.S.C. 154(b) by 0 days.

(21) Appl. No.: 18/560,880

(22) PCT Filed: Apr. 28, 2023

(86) PCT No.: PCT/US2023/066349
§ 371 (c)(1),
(2) Date: Nov. 14, 2023

(87) PCT Pub. No.: WO2023/212682
PCT Pub. Date: Nov. 2, 2023

(65) Prior Publication Data
US 2025/0074627 A1 Mar. 6, 2025

Related U.S. Application Data

(63) Continuation of application No. 17/734,051, filed on Apr. 30, 2022, now Pat. No. 12,139,276.
(Continued)

(51) Int. Cl.
*B64G 99/00* (2009.01)
*B64F 1/06* (2006.01)
(Continued)

(52) U.S. Cl.
CPC ............... *B64G 99/00* (2022.08); *B64F 1/06* (2013.01); *B64G 1/002* (2013.01); *B64G 5/00* (2013.01)

(58) Field of Classification Search
CPC .......... B64G 1/002; B64G 99/00; B64G 5/00; B64F 1/06; B64U 70/70
See application file for complete search history.

(56) References Cited

U.S. PATENT DOCUMENTS

| 1,316,397 A | 9/1919 | Steinberger |
| 4,632,086 A | 12/1986 | Rutten |

(Continued)

FOREIGN PATENT DOCUMENTS

| CN | 101559286 | 10/2009 |
| CN | 108724187 | 11/2018 |

(Continued)

OTHER PUBLICATIONS

Qadeer et al, Intelligent Tracking of Mechanically Thrown Objects by Industrial Catching Robot for Automated In-Plant Logistics 4.0, Sensors (Mar. 2022).

(Continued)

*Primary Examiner* — Rodney A Bonnette
(74) *Attorney, Agent, or Firm* — Venjuris, P.C.

(57) ABSTRACT

This invention is embodied in a system and method for transferring energy and mass (supplies) in low-gravity environments. Broadly, the preferred system comprises a launcher, a receiver, and a capsule. The capsule is used to transfer a payload (e.g., supplies) between the launcher and a receiver. In addition, the receiver converts a portion of the payload's kinetic energy to potential energy via regenerative braking and stores the energy for later use. The stored energy can be used at the receiver end for applications such as powering habitats, mining operations, life-support systems, (Continued)

etc. In some instances, a portion of the stored energy can be used to re-launch the payload. Launchers and receivers can be established in different spatial network configurations in lower gravity environments such as in a circle with a centrally located launcher, a launcher downstream of a chain of receivers, or other configurations.

20 Claims, 21 Drawing Sheets

Related U.S. Application Data

(60) Provisional application No. 63/498,931, filed on Apr. 28, 2023, provisional application No. 63/451,896, filed on Mar. 13, 2023, provisional application No. 63/427,692, filed on Nov. 23, 2022, provisional application No. 63/427,701, filed on Nov. 23, 2022.

(51) Int. Cl.
   *B64G 1/00* (2006.01)
   *B64G 5/00* (2006.01)

(56) References Cited

U.S. PATENT DOCUMENTS

| | | | |
|---|---|---|---|
| 5,857,451 A * | 1/1999 | Ciluffo | F41B 3/04 124/6 |
| 9,440,353 B1 | 9/2016 | da Silva et al. | |
| 10,023,393 B2 | 7/2018 | Brazeau et al. | |
| 10,144,591 B2 | 12/2018 | Brazeau et al. | |
| 10,759,052 B2 | 9/2020 | Scott et al. | |
| 10,926,408 B1 | 2/2021 | Vogelsong et al. | |
| 2009/0224097 A1* | 9/2009 | Kariv | B64F 1/029 244/110 F |
| 2014/0306066 A1 | 10/2014 | Burch | |
| 2018/0194496 A1* | 7/2018 | Yaney | B64G 1/005 |
| 2018/0237171 A1 | 8/2018 | Yaney | |
| 2019/0126478 A1* | 5/2019 | Scott | B25J 9/1679 |
| 2019/0389603 A1 | 12/2019 | Burch | |
| 2020/0009351 A1 | 1/2020 | Walzman | |

FOREIGN PATENT DOCUMENTS

| | | |
|---|---|---|
| CN | 109533826 | 3/2019 |
| CN | 208994531 | 6/2019 |
| CN | 110254754 | 9/2019 |
| JP | 2020066335 | 4/2020 |
| WO | WO2015/167384 | 11/2015 |

OTHER PUBLICATIONS

Okada et al., Robust Throwing Design Based on Dynamic Sensitivity Analysis, The Japan Society of Mechanical Engineers (Jan. 2019).

Frank et al., Throwing Objects—A bio inspired Approach for the Transportation of Parts, International Conference on Robotics and Biomimeties, Dec. 17-20, 2006, Kunming, China.

Kotenberg et al., U.S. Patent Application for Projectile Transmission of Lunar Resources, US Provisional Patent Application fled Jun. 17, 2021, U.S. Appl. No. 63/212,058.

Kari Rodriquez, International Search Report and Written Opinion, PCT application PCT/US/2023/066349 (Oct. 5, 2023).

* cited by examiner

LOW GRAVITY POWER DISTRIBUTION SYSTEM AND DEVICE

FIELD OF THE INVENTION

The present invention relates to the field of transportation, and more particularly to the field of energy and mass transportation.

BACKGROUND

The space economy is worth $469 billion and is poised for further explosive growth over the next decade. Over the last twenty years, the trend toward reusable launch vehicles has driven down the costs associated with getting into space—and has made new industries like in-space servicing, assembly, and manufacturing (ISAM) and in-situ resource utilization (ISRU) increasingly viable. A proliferation of small businesses, startups, and large incumbents in the space economy have focused their efforts on making these industries profitable and sustainable. Currently, the ISAM and ISRU sectors are nascent but promising. Importantly, this trend is not just coming from the private sector: at the time of writing, the United States has launched the Artemis mission as part of its commitment to establishing a sustained deep-space presence and building a robust lunar economy driven by the ISRU sector. (The American-drafted Artemis Accords, which outlines a framework for lunar economic development and exploration, has been signed by 23 countries). Ultimately, a combination of private and government attention directed toward the space economy is a powerful vector for opportunity and economic growth.

There are manifold technical and business challenges that must be addressed to establish the lunar and broader deep-space economy. One particularly salient concern is logistics and transportation of cargo across the lunar surface. Lunar logistics is a problem for several reasons:

1. First, despite falling launch costs to Low Earth Orbit (LEO), it is still expensive to transport equipment to the surface of the Moon. Presently, launch costs are approximately $500,000 per kilogram, which constrains the number viable logistics architectures for lunar operations.
2. Second, any lunar logistics solution will need to traverse (or elide) rough terrain. Mining operations for the ISRU sector will likely take place within the icy walls of steep craters. Furthermore, lunar regolith is notoriously abrasive and can degrade equipment on the lunar surface.
3. Third, the logistics architecture must scale with the lunar economy scale. Long-haul transportation of regolith, water, and propellant will be required to connect mining operations with centralized refineries, construction zones, and depots.
4. Fourth, the lunar economy will be energy intensive. Existing solutions are not viable. Power cables are heavy and expensive, and wireless power beaming is still too inefficient to scale.

Long-standing space logistics platforms like rovers and landers will play important roles in the lunar value chain, but given the interrelated challenges listed above, new lunar logistics solutions must be developed to augment rover and lander-based architectures. As such, a cost-effective system and methodology for transporting cargo (including batteries for power distribution) that is lightweight, optimized for the lunar terrain, and capable of efficient long-range operation must be developed.

SUMMARY OF INVENTION

The subject of this invention is embodied in a system and method for transferring energy and mass (supplies) in low-gravity environments. Broadly, the preferred system comprises a launcher, a receiver, and a capsule. The capsule is used to transfer a payload (e.g., supplies) between the launcher and a receiver. In addition, the receiver converts a portion of the payload's kinetic energy to potential energy via regenerative braking (e.g., a Kinetic Energy Recovery System (KERS)) and stores the energy for later use. The stored energy can be used at the receiver end for applications such as powering habitats, mining operations, life-support systems, etc. In some instances, a portion of the stored energy can be used to re-launch the payload. Launchers and receivers can be established in different spatial network configurations in lower gravity environments such as in a circle with a centrally located launcher, a launcher downstream of a chain of receivers, or other configurations.

The launcher and receiver are preferably identical devices. That is, the same device can both launch and receive a payload. For the purposes of this specification, the preferred device is referred to as the LNR (launching and receiving) device 10. Broadly, the preferred LNR device comprises a main shaft positioned along a central axis and connected between a pair of frames. A rotary arm is connected to the shaft by roller bearings. The rotary arm spins on shaft mounted roller bearing. A motor spins the rotary arm and a sensing device monitors the rotary arm's position and velocity.

The preferred rotary arm comprises two spokes. A release mechanism is mounted to the distal end of the first spoke. The release mechanism has at least two positions: a closed position for retaining a payload as the rotary arm spins up to launching speed, and an open position for releasing the payload at the desired time. A catch mechanism is mounted to the distal end of the second spoke. The catch mechanism comprises a concave surface for catching incoming payloads.

To control the payload release angle, a bridge is rotatably connected to the shaft and powered by a second motor. Positioning an electro-magnet on the bridge enables actuation of the release mechanism at the desired angle as the rotary arm spins. Adjusting the rotational position of the bridge will adjust the angle of the payload release.

A counterbalance system keeps the LNR device balanced before and after a payload launch. The preferred counterbalance system comprises a first counterbalance assembly connected to the shaft. The preferred counterbalance assembly has at least two positions: a locked position and a free position. In the locked position, the counterbalance assembly is fixed to the rotary arm. In the free position, the counterbalance is not fixed to the rotary arm. The purpose of the free position is to allow the counterbalance to rotate 180° relative to the rotary arm (i.e., switching from one spoke to the other). To enable this 180° relative rotation, a second magnetic element is positioned on the bridge. Actuating the second magnetic element will slow the rotation of the counterbalance in the free position relative to the rotary arm and enable the 180° relative rotation.

It is preferred to use a second counterbalance assembly in combination with the first counterbalance assembly. The rotational inertias of each of the two counterweight assemblies are preferably equal. In addition, the counterweight assemblies should have a combined rotational inertia equal to the rotational inertia of the payload. That way, when both counterweights are positioned opposite the payload, the system will be balanced. Likewise, after the payload has been released, each counterweight can be positioned opposite each other to maintain balance.

To add additional degrees of freedom and adjustability, it is preferred to mount the frames on a chassis. The preferred chassis has a pair of rotating turntables and a linear track to enable two degrees of rotational freedom and one degree of linear freedom.

BRIEF DESCRIPTION OF THE DRAWINGS

FIG. 13 is a perspective view of the rotary arm and counterbalance assemblies, with the counterbalance assemblies in position 1. Note button 58 pushed in.

DESCRIPTION OF THE PREFERRED EMBODIMENT

This specification is primarily directed to launching within a 25 km corridor. But a person skilled in the art will recognize that the system can be optimized to reduce cost or transport more mass further distances. Likewise, the preferred materials for making the LNR device are light weight titanium or aluminum, and the preferred method of manufacture will often be CNC milling or EDM machining. But other materials and other methods of manufacture could be used and adjusted as desired to suit the circumstances.

The primary elements of the preferred LNR device will be described in more detail in the sections that follow.

Figure 1:
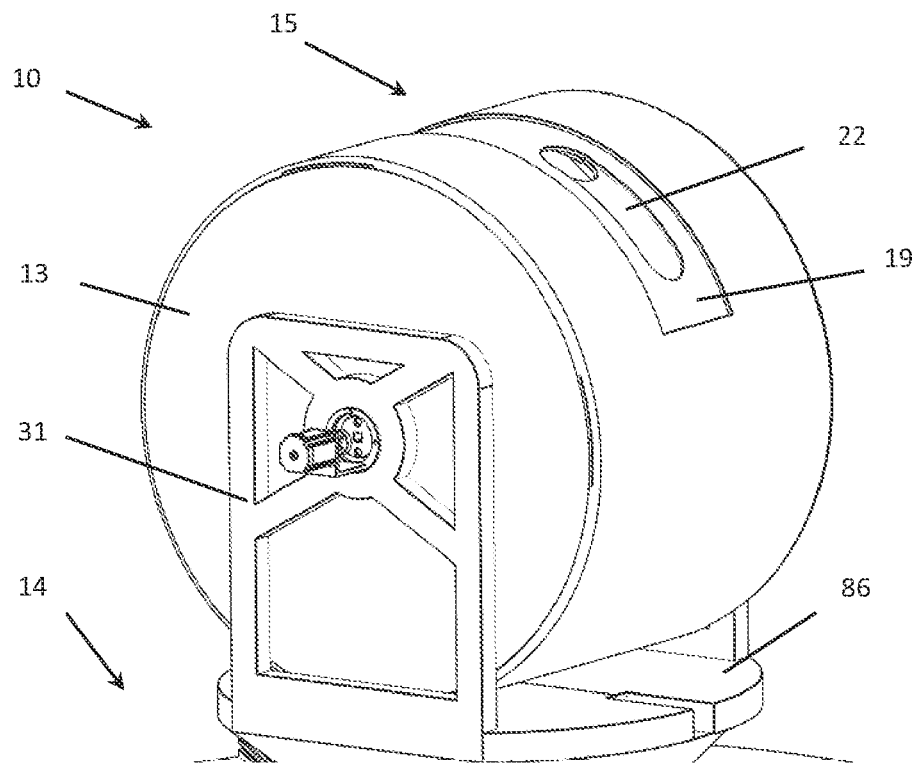
FIG. 1 illustrates a perspective view of a preferred embodiment of the invention.
Figure 2:
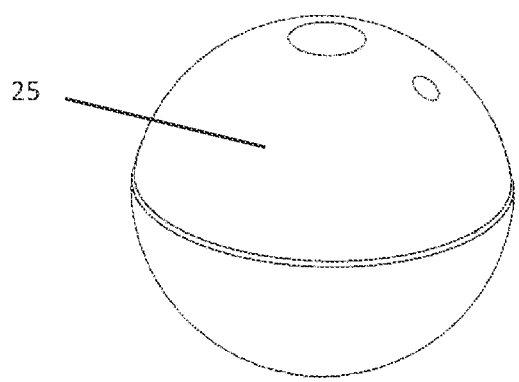
FIG. 2 illustrates an embodiment of a spherical capsule.

The following steps provide an overview of a 25-km launch and catch:

1. A payload is loaded into the LNR device 10. See FIG. 1. The preferred payload is spherical capsule 25 that carries various types of cargo. See FIG. 2. But other options are also viable (e.g., empty capsule, non-spherical capsule, and no capsule). (See, payload section below.)
2. When loading the payload into the launching LNR device 10, the payload can be carried up via actuator through the center of the chassis and held by the release mechanism 43. The release mechanism 43 is mounted on the distal end of rotary arm 34. (See, e.g., FIG. 4; see also, Rotary Arm section below.)

3. Motor 65 spins rotary arm 34 around shaft 28 until the rotary arm reaches a desired angular velocity. At that point, the payload is released at a preferred angle. (See, launch operation section below.)
4. Releasing the payload changes the rotary arm's moment of inertia. To counteract this change of inertia, a dynamic counterbalance system is preferably employed. (See, counterbalance section below.)
5. The receiving LNR device 10 can be maneuvered into the proper position to catch the payload. (See, chassis section below.)
6. Prior to the catch, the receiving LNR's rotary arm 34 spins up so that the tip of the arm's tangential velocity matches the velocity of the incoming payload. Ideally, the only force introduced to the system involves changing the payload's trajectory into rotational motion. (See, catching operation below.)
7. Once the receiver catches the payload, the receiver's rotary arm 34 slows and the receiver can unload the payload. Through a regenerative braking process, the receiver can recover a portion of the inbound payload's kinetic energy to improve the system's energy efficiency.

With this overview, we turn now to each of the main parts of the preferred LNR device 10.

Exterior Cover

The exterior cover has two primary functions: (1) it houses the launching/receiving mechanisms, and (2) it corrals mislaunched payloads. The exterior cover comprises two major parts: a fixed outer housing 13 and a rotating bridge 17. Outer housing 13 is rigidly connected to frames 31. The outer housing 13 does not rotate relative to the frames. The bottom of the frames 31 are rigidly connected to the first turntable 86, which is part of the chassis 14, and transmits load to the chassis 14. Main shaft 28, about which the rotary arm 34 spins, is connected between the upper ends of each frame 31.

Figure 3:
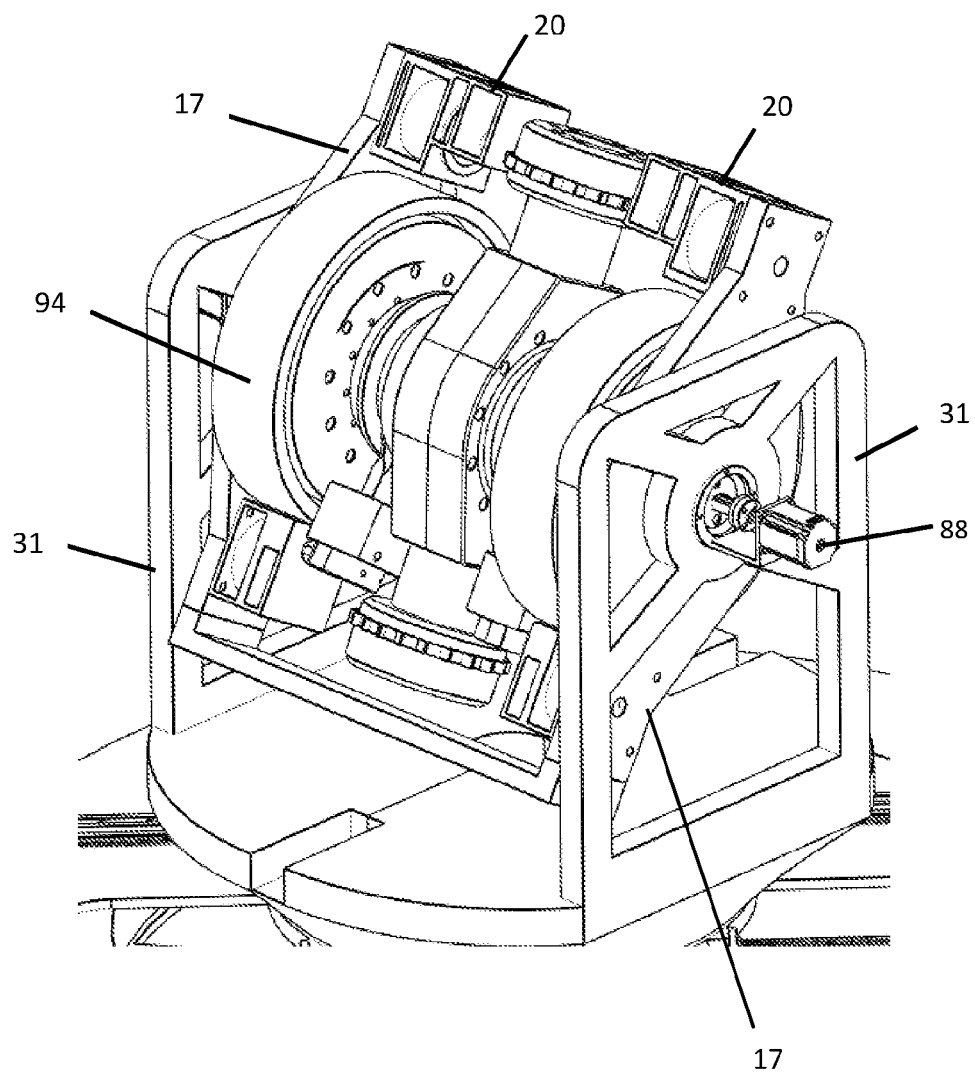
FIG. 3 illustrates a perspective view of an embodiment of the device.
Figure 4:
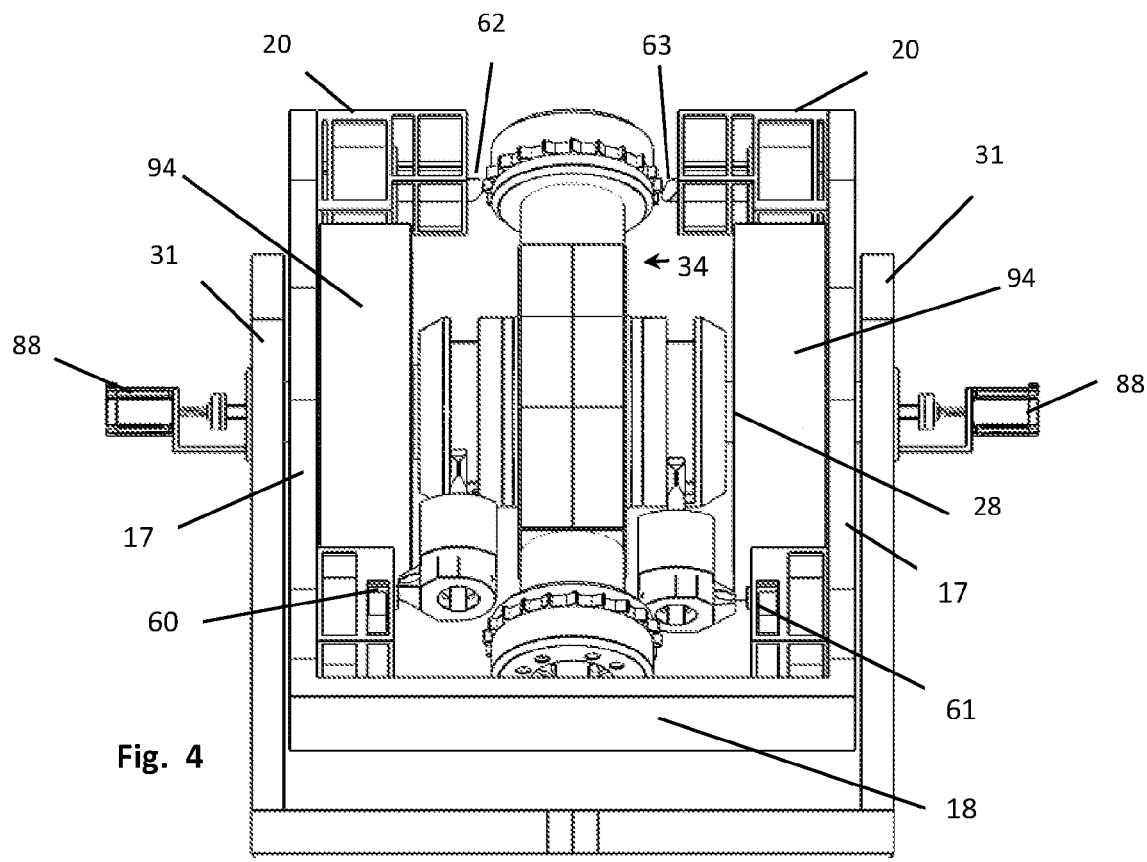
FIG. 4 illustrates a front view of the embodiment of FIG. 3.
Figure 5:
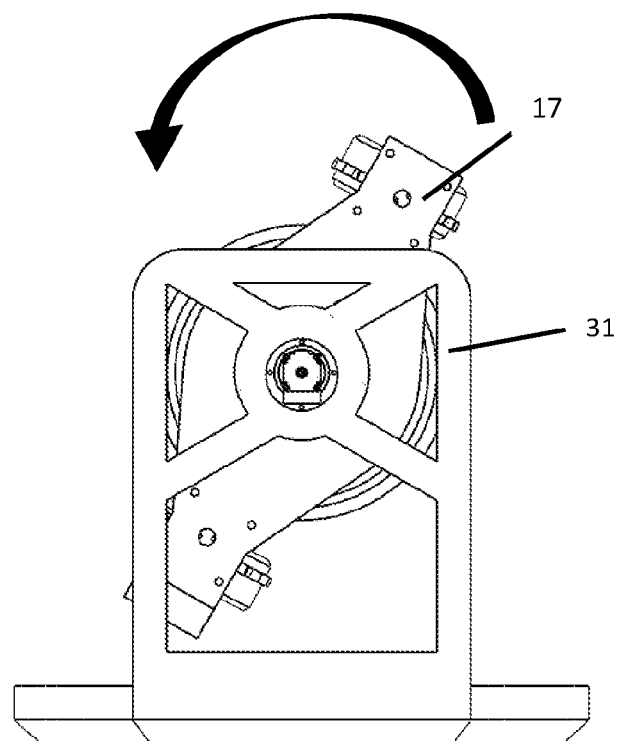
FIG. 5 illustrates a side view of the embodiment of FIG. 3.
Figure 6:
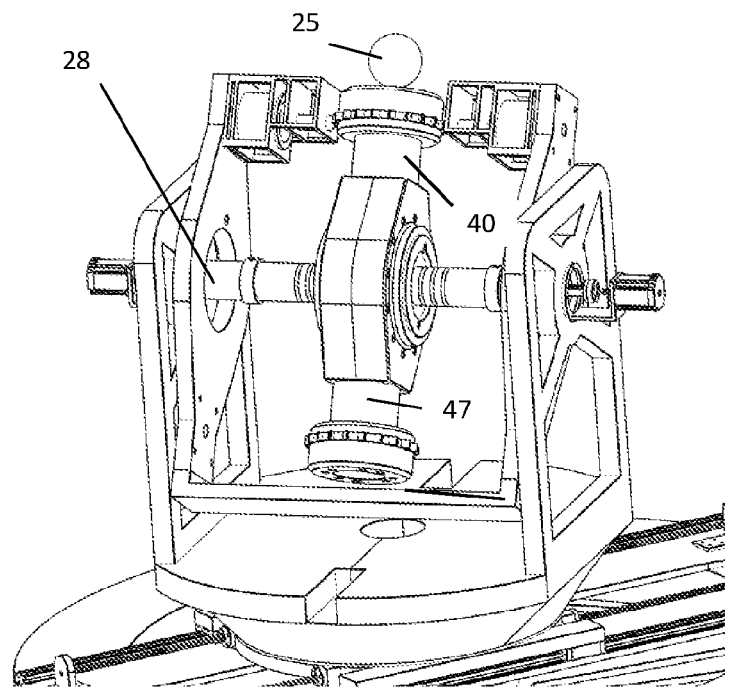
FIG. 6 illustrates a perspective view of the embodiment of FIG. 3 with the counterbalance assemblies and the rotary arm momentum storage system (RAMSS) removed.

Turning to FIGS. 3-5, rotating bridge (or "bridge") 17 is a structural element that rotates about the main shaft 28. An actuator motor drives the bridge's rotation. The actuator motor for bridge 17 is preferably mounted to shaft 28. The main purpose of the bridge is to create angular adjustability for launching and receiving payloads. A bridge connector 18 can be employed to connect bridge elements. The bridge connector 18 increases rigidity of the bridge 17 when its actuator does work on the release mechanism and counterbalance. This also keeps both sides of bridge 17 aligned. The outer housing 13 does not rotate relative to the frames—just the bridge. The bridge allows for adjustment of the launch and catch angles. In addition, electronic devices can be mounted to the bridge. The bridge also provides the structure for connecting the launch shield and sliding door.

A payload release magnet 62 (and payload lock magnet 63) can be mounted on the bridge via a bridge frame 20 and used to activate the release mechanism (discussed below). In short, the payload release magnet 62 is preferably a single electro-magnet that will actuate a cam-collar for the release of a payload. Counterbalance magnets (60, 61) are also mounted to the bridge via bridge frames 20. Release/lock magnets (62, 63) and counterbalance magnets (60, 61) are preferably positioned on separate radii from the center shaft 28 to ensure they do not interfere with each other. See FIG. 4.

Figure 40:
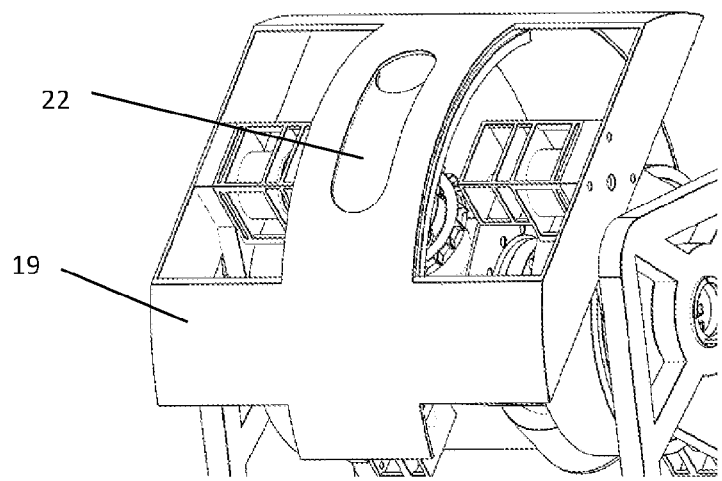
FIG. 40 illustrates a front perspective view of the shield and door mounted to the bridge.
Figure 41:
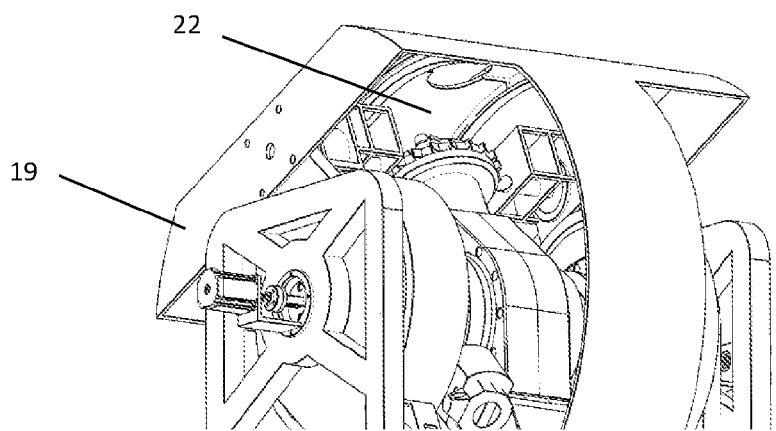
FIG. 41 illustrates a rear perspective view of an embodiment of the shield and door mounted to the bridge.
Figure 42:
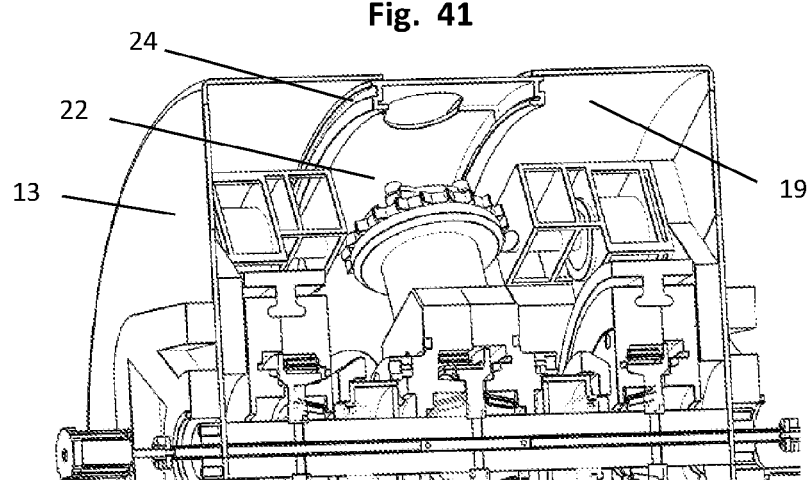
FIG. 42 illustrates a rear section view of an embodiment of the shield, door, and outer housing.
Figure 43:
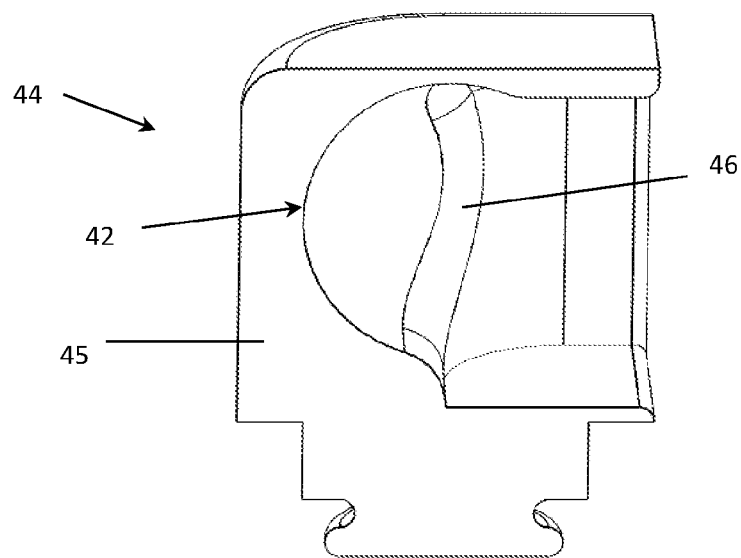
FIG. 43 illustrates a section view of an embodiment of an empty catch mechanism.
Figure 44:
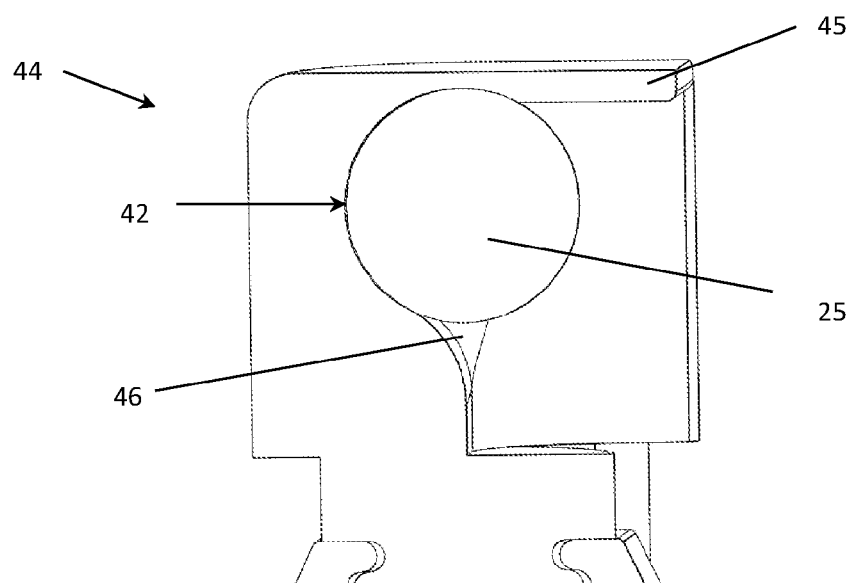
FIG. 44 illustrates a section view of an embodiment of a catch mechanism with a capsule inside.
Figure 45:
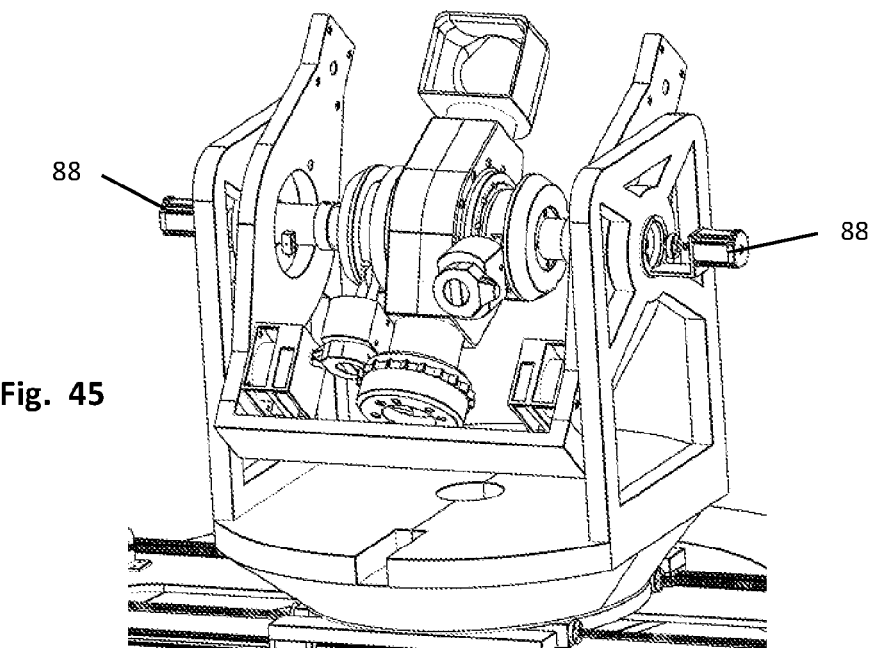
FIG. 45 illustrates an embodiment with the right-side counterweight in the free position (2nd position) and beginning its 180° rotation to the other spoke of the rotary arm.
Figure 46:
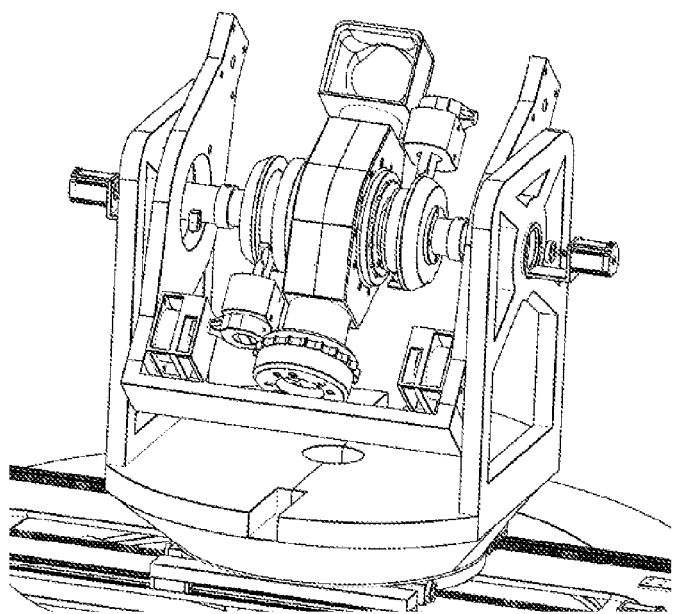
FIG. 46 illustrates an embodiment with the right-side counterweight in the locked position (3rd position) on the opposite spoke as (180° from) the left-side counterbalance assembly, which is also in the 3rd position.

Turning back to FIG. 1, outer housing 13 has an elongated opening 15 at the top. The elongated opening 15 permits a payload to enter or exit the device 10 along its length. To cover the elongated opening 15 as much as possible, yet still permitting launch and catch operations, it is preferred to mount shield 19 to bridge 17 and slidably connect door 22 to shield 19. As shown in FIGS. 40-41, shield 19 is mounted to bridge 17. Shield 19 rotates with bridge 17 to change the launch/catch angle. Door 22 slides on rails 24 to open and close the elongated opening 15. Door 22 is opened during launch/catch to permit a payload to exit/enter the elongated opening 15.

Door 22 preferably comprises an actuator to slide open and closed. The combination of shield 19 and door 22 can be used to cover the elongated opening 15 when the LNR device is not launching or catching. It is preferred to keep the doors closed as much as possible to prevent dust and other debris from entering the exterior cover. As such, it is preferred to only open door 22 to launch and catch.

Outer housing 13 can be made from a durable metal, e.g., aluminum plating. Outer housing 13 forms a disc-shaped interior volume that encloses the launching/receiving mechanism. The protective cover prevents a payload from escaping the exterior cover if it is released at an unacceptable angle. If the payload's launch angle is incorrect, the protective cover will retain the payload inside the exterior cover. The payload will roll around the inside surface of the exterior cover until it bleeds off its kinetic energy and comes to rest at the bottom of the exterior cover. The payload can be removed when there is no kinetic energy in the system.

Rotary Arm

A payload must be launched at a higher velocity and/or flight path angles to travel farther. The preferred LNR device comprises a rotary arm 34 that can spin up to 1,100 RPM. With this capability, the LNR device can launch a payload up to 200 m/s or 25 km across the lunar surface.

Figure 7:
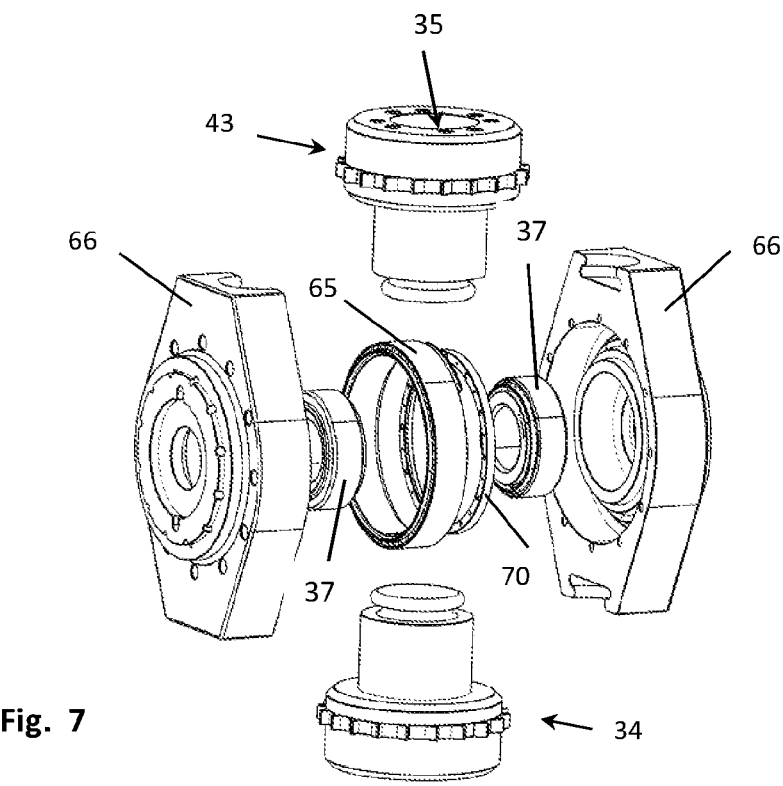
FIG. 7 illustrates an exploded view of an embodiment of the rotary arm.
Figure 8:
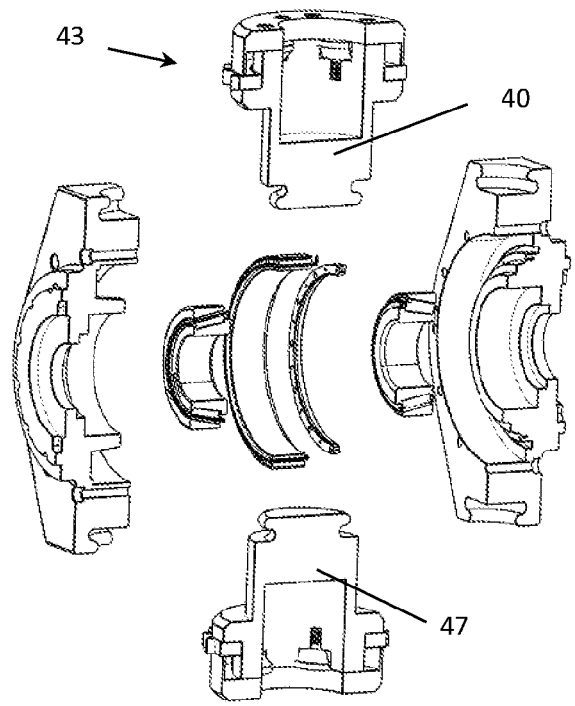
FIG. 8 illustrates a section view of FIG. 7
Figure 36:
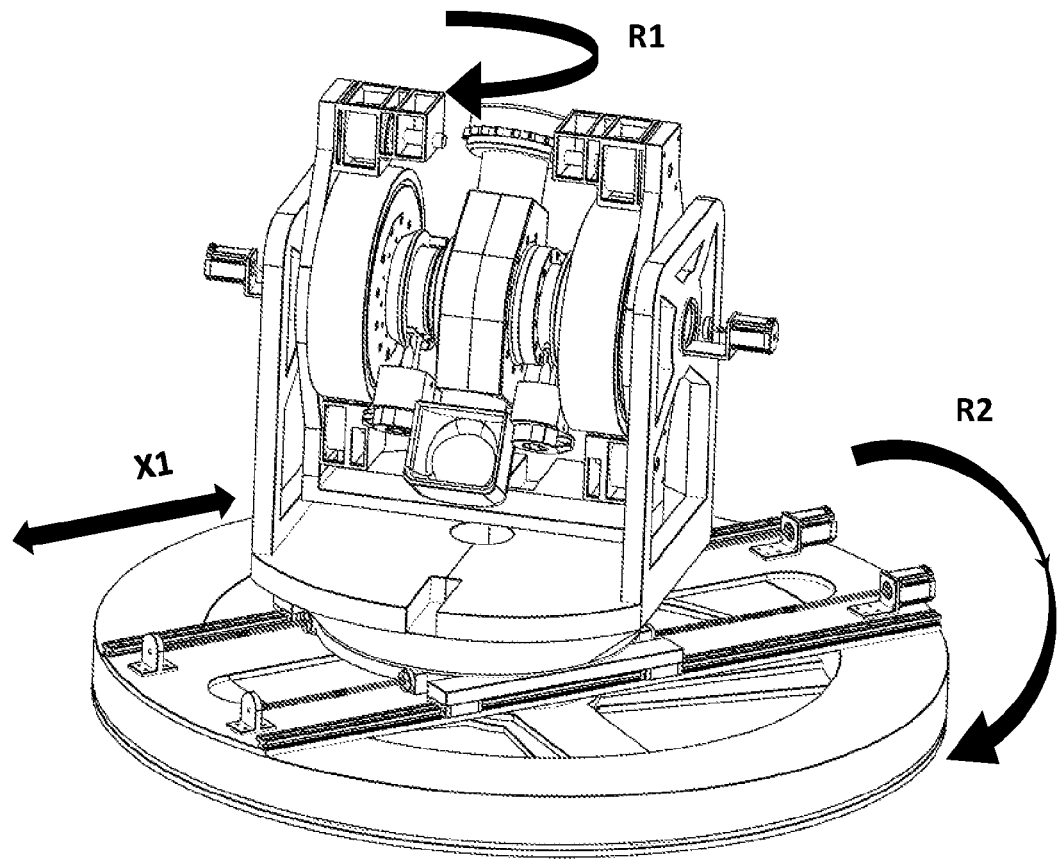
FIG. 36 is a view of an embodiment of the device mounted on a chassis featuring three degrees of freedom: R1, R2, and L1.
Figure 37:
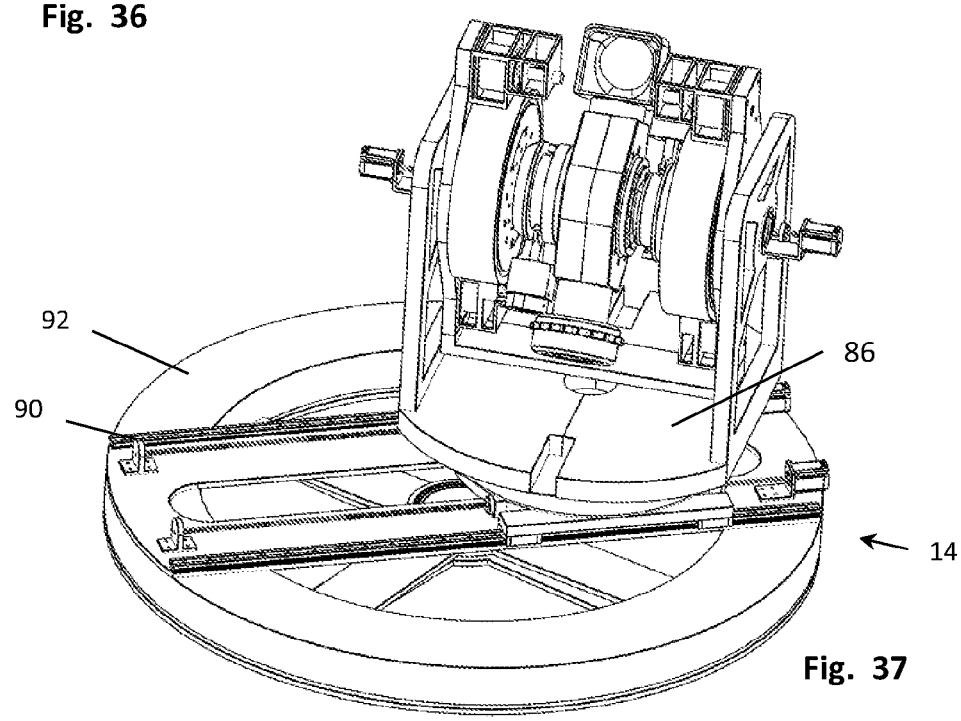
FIG. 37 is another view of an embodiment of the device mounted on a chassis.
Figure 38:
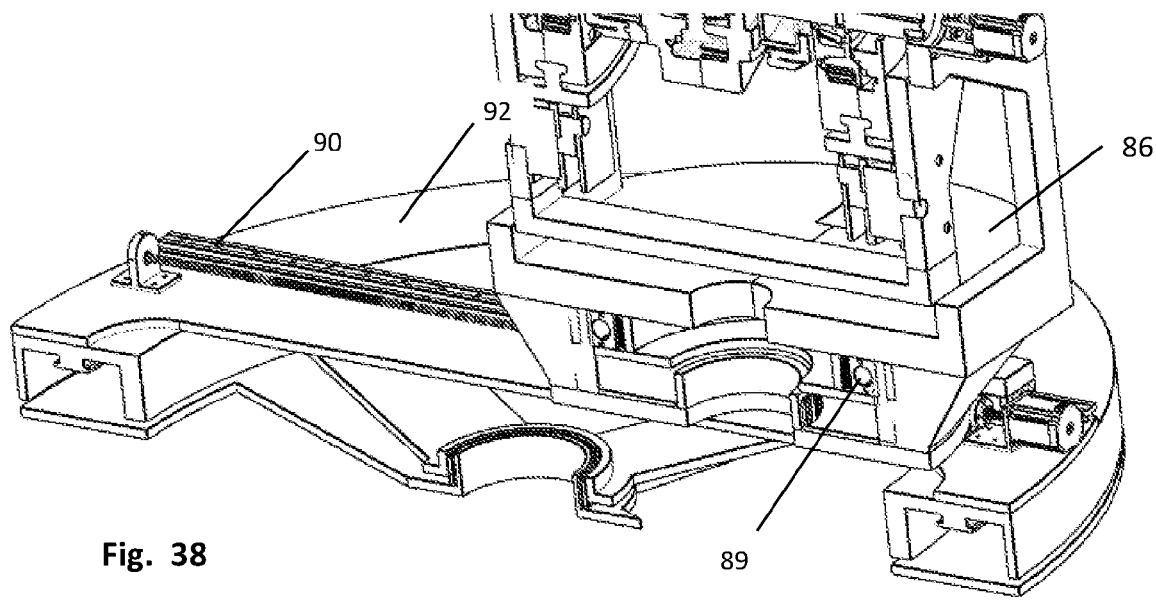
FIG. 38 illustrates a section view of the embodiment shown in FIG. 32.
Figure 39:
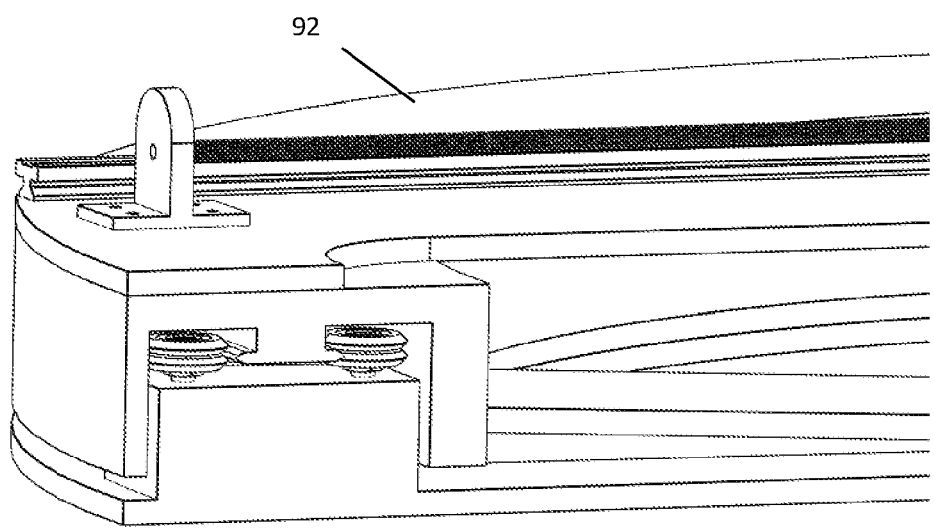
FIG. 39 illustrates a closer section view of the second turntable of FIG. 32.

The preferred rotary arm 34 comprises four main parts: a rotor hub 66, a pair of spokes (40, 47), a release mechanism 43, and a catch mechanism 44. As shown in FIG. 7 and FIG. 36, the rotor hub 66 encloses a pair of roller bearings 37, a motor 65, and a rotary encoder 70. The spokes (40, 47) are connected to the distal ends of rotor hub 66. The spokes are preferably identical and comprise a release mechanism on their respective distal ends. This is for the preferred embodiment, in practice the LNR can have multiple spokes, as few as one and as many as can fit. The release mechanism 43 is connected to first spoke 40 and the catch 82 mechanism is connected to second spoke 47. Shaft 28 passes through the center of rotor hub 66.

Figures 33, 34, 35:
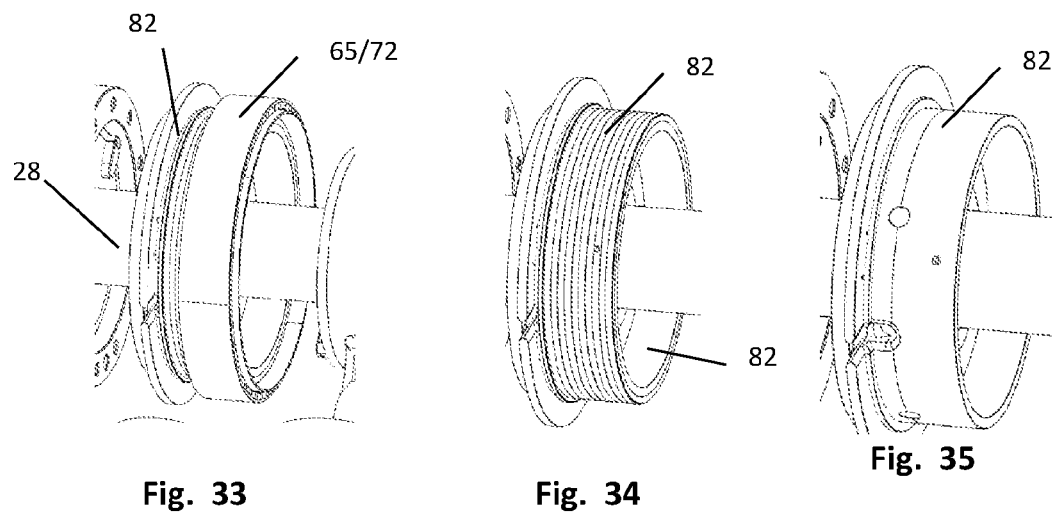
FIG. 33 is a view of an embodiment of the motor/stator mounted on the main shaft.
FIG. 34 is a view of a motor sleeve.
FIG. 35 is a view of a stator hub.

Motor 65 turns the rotary arm. The motor is preferably a brushless DC Direct Drive Motor (BLDC DDM) motor comprising a stator 72. The stator 72 can be epoxied to DDM sleeve 74 that is press fit on a hub 82. See FIGS. 33-34. Hub 82 can be press fit onto static shaft 28. See, FIG. 35. In this configuration, the motor can drive the rotary arm about the main shaft via the bearings 37. The motor 65 is preferably located near the shaft and can spin the rotary arm 34 to a desired speed.

FIGS. 3, 4, and 5 illustrate a preferred embodiment. As shown, main shaft 28 is positioned along a central axis and connected on either end to frames 31. The frames provide structural support to the shaft and transmit forces down to the chassis below (not shown). It is preferred that the main shaft 28 be fixed and that the rotary arm 34 be connected to the shaft by a pair of roller bearings 37. (See FIG. 7.) It is also preferred that shaft 28 be a tube so that wiring and other elements (such as rods 89) can pass through it.

When using a rotary launch mechanism, the release angle and speed should be precisely controlled. Ordinarily, the launch window for the payload would be less than 1.5 milliseconds. A rotary encoder 70 with a high pulse per revolution can be used to actively monitor the precise location and velocity of the rotary arm 34. The logic required to ensure high accuracy within the system can be implemented on a microprocessor. The microprocessor allows the collection and interpretation of the data gathered from the connected devices and sensors. Additionally, the microprocessor ensures the motor to operate under specified conditions, resulting in consistent launches and catches. The logic within the microprocessor also gathers environmental feedback from the devices to ensure all components are protected and remain within desired operating conditions.

Optionally, spokes (40, 47) of the rotary arm 34 could be curved. A curve allows an errant payload (i.e., one is not directly caught at the tip) to be captured then roll to the tip of the arm, at which point the release mechanism will hold it in place. In addition, the rotary arm 34 could be sized so that it can withstand a catch up to ⅓ of the way to the center of the arm.

Likewise, both spokes (40, 47) could be prepared to catch a payload. If the payload is caught too close to the center of the arms, the kinetic energy imparted could damage the rotary mechanism because of the velocity differential. There are two catching windows with each revolution (one for each spoke). The catch windows are larger than the launch windows. Optionally, the rotary arm could be sized three times as wide as a payload to provide a higher error tolerance for a catch.

Figure 30:
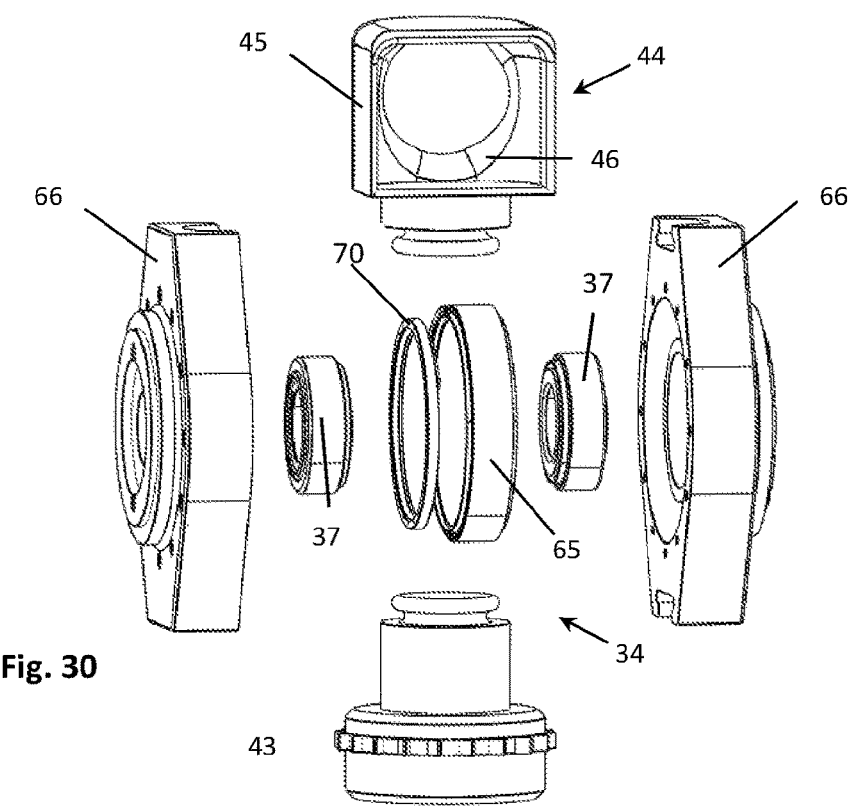
FIG. 30 is an exploded view of FIG. 29.
Figure 31:
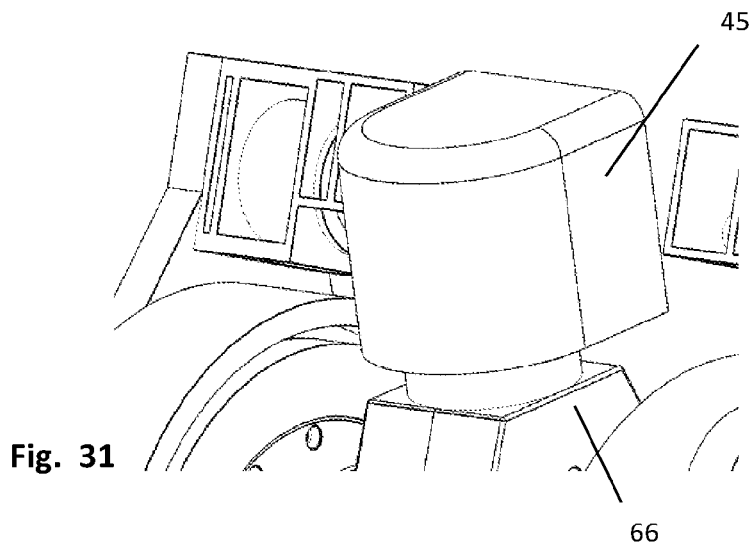
FIG. 31 is a rear perspective view of an embodiment of the catch mechanism 45.
Figure 32:
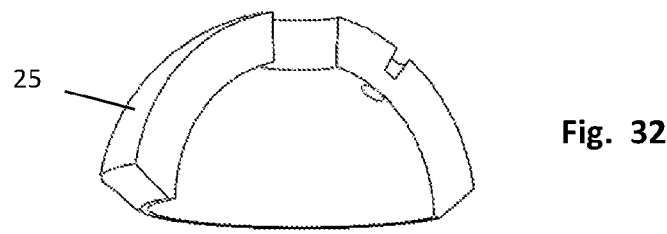
FIG. 32 is a section view of a capsule embodiment.

Turning to FIG. 30, the catch mechanism 44 is connected to a spoke (40, 47). The catch mechanism preferably comprises a housing 45 with an open front. A funnel/guide 46 is mounted to the housing to accommodate slight trajectory perturbations on the inbound payload. The funnel/guide 46 directs an incoming object into a concave surface 42 mounted to the interior of housing 45.

Release Mechanism

Figure 9:
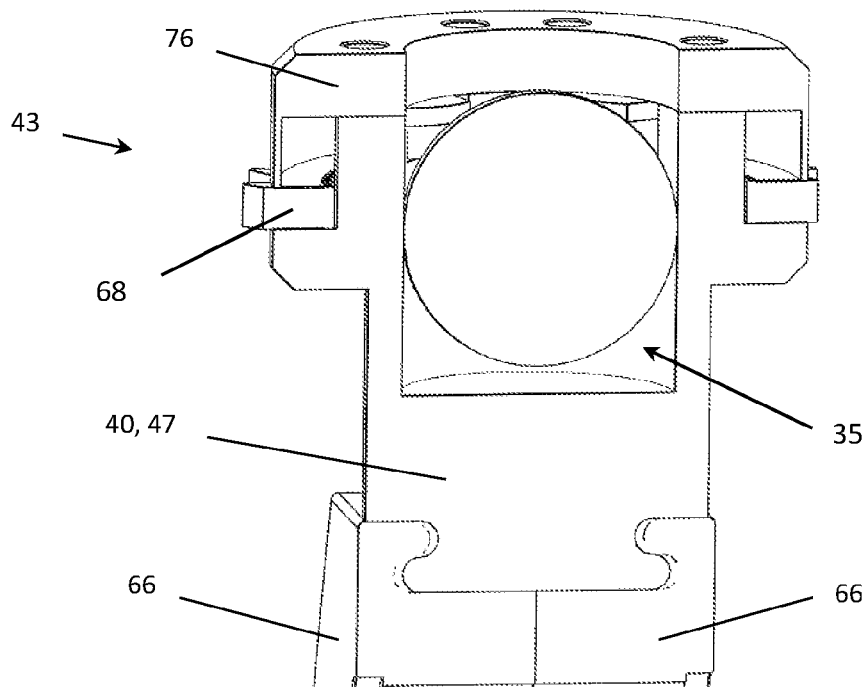
FIG. 9 illustrates a section view of the preferred release mechanism.
Figure 10:
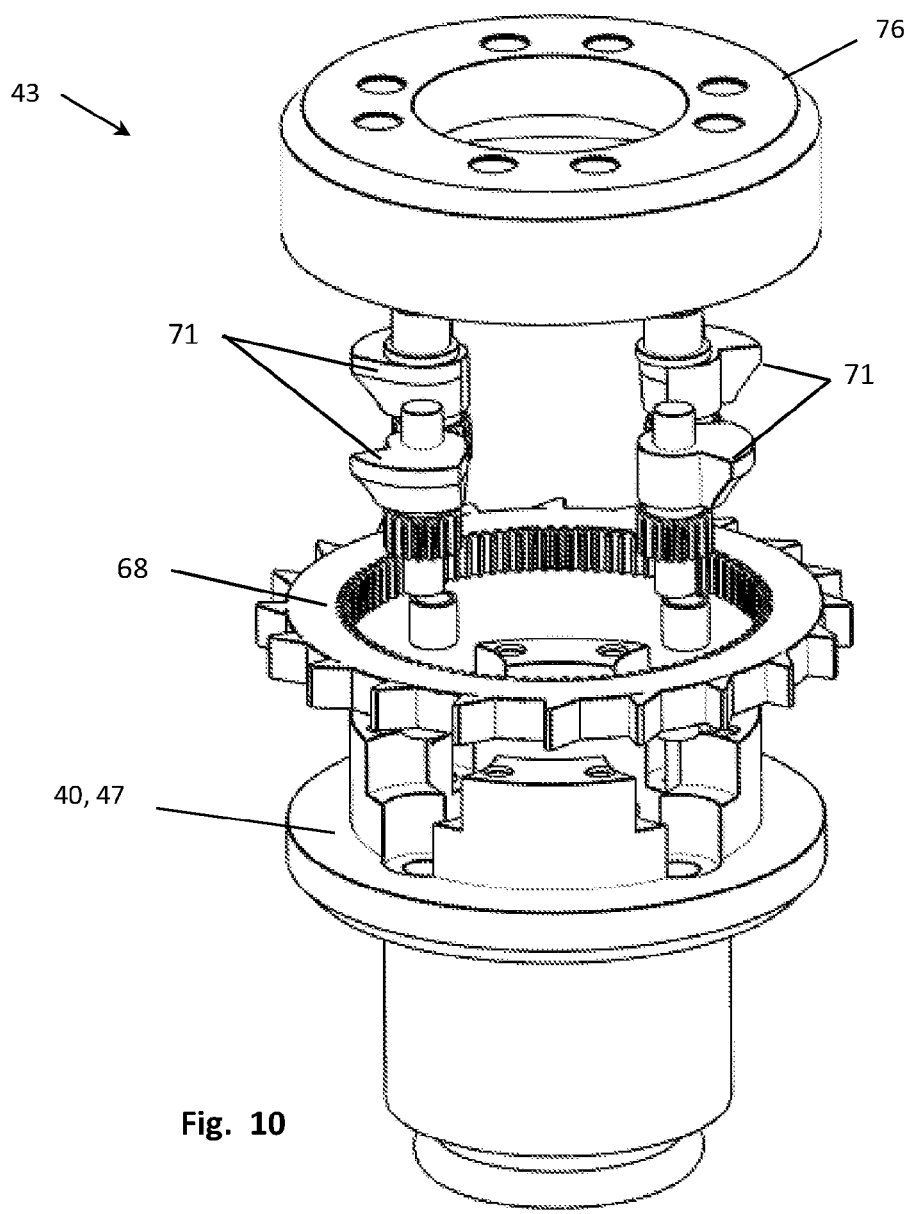
FIG. 10 illustrates an exploded view of the preferred release mechanism.
Figure 11:
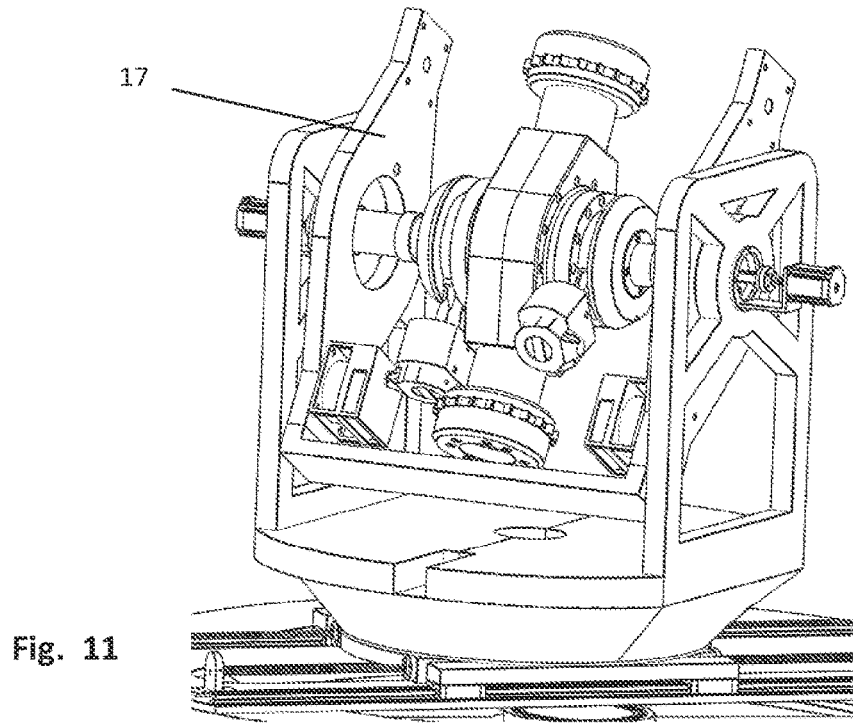
FIG. 11 illustrates a perspective view of the embodiment of FIG. 3 with the shaft and the rotary arm momentum storage system (RAMSS) removed.

At times, the rotary arm 34 will contain a payload in launch chamber 35. As shown in FIGS. 9 and 10, launch chamber 35 is comprised of collar 68 that actuates four spiral clamping cams 71 (via teeth or gears) when the collar is rotated. The cams move rollers (in and out) to lock and release the payload. A spoke cover 76 is connected to the spokes (40, 47) and pins the cams 71 in place while permitting rotation.

In operation, the payload is initially locked in position (the closed position), whereby the four cam-actuated rollers 71 retain the payload in chamber 35. Actuation of collar 68 rotates the cams and unlocks capsule 25 in the launch chamber 35 (the "open position"). It is preferred that only the clamping cams 71 hold the payload in place, rather than allowing the capsule 25 to touch the side wall. As illustrated in FIG. 9, clamping cams 71 are placed near the widest diameter of the payload so that on release, the clamping cams only need to actuate a small amount.

Figure 27:
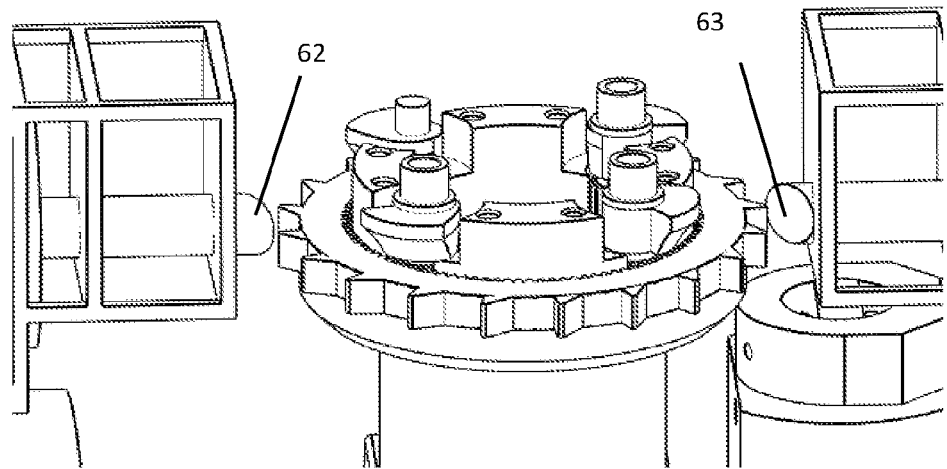
FIG. 27 is the perspective view of FIG. 24 with the spoke cover removed and the magnetic element having an angled tip.

Actuating the collar 68 and releasing a payload (that is, move the releasing mechanism from the closed position to the open position) preferably happens via release magnet 62. (For the purposes of this specification, "magnet" means a magnetic element. That is, a "magnet" could be an actual magnet. But it is preferred to position the actual magnet on the bridge frame 20 and extend the magnetic field to the collar 68 via a ferromagnetic element.) Release magnet 62 is preferably an electro-magnet. See, FIGS. 24-27. Collar 68 also preferably comprises a ferromagnetic element. Thus, when the release magnet 62 is turned on it creates a magnetic couple with collar 68 and rotates it. Using a magnet to actuate collar 68 avoids having to deploy an actuator that must resist the G-forces at the tip of the arm (essentially stopping the payload from flying out by holding it from the other side). Optionally, tip of release magnet 62 could be angled to increase the magnetic force on collar 68. See FIG. 27. Upon release, the second collar magnet 62 causes collar 68 to move in the opposite direction, back into the locked position.

Figure 28:
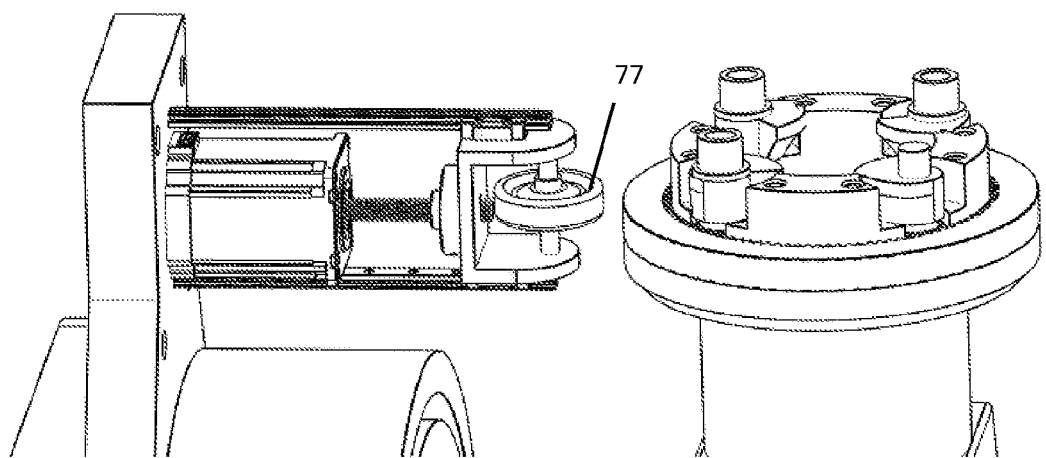
FIG. 28 illustrates an alternate embodiment of a release actuator featuring an extendible roller.
Figure 29:
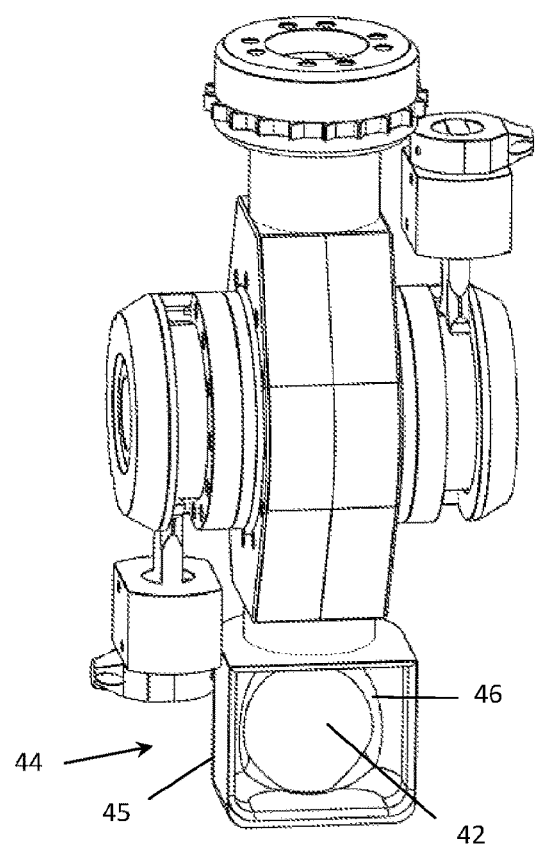
FIG. 29 is a perspective view of the preferred rotary arm with a release mechanism on the first spoke and a catch mechanism on the second spoke.

Alternatively, instead of using a magnet, a roller 77 could be extended out once to launch the payload. See FIG. 28. Once the roller 77 is extended far enough, it will engage collar 68, which will rotate collar 68 slightly relative to the entire release mechanism. As a result, cams 71 will release their grip on the payload and it will launch.

Counterbalance

It is important that the LNR device stays in balance as much as possible during operation. Otherwise, induced vibrations from unbalanced conditions could lead to an inaccurate launch and shorten the operational life of the LNR. Typically, when chamber 35 is empty, rotary arm 34 will be balanced. But when chamber 35 is holding a payload, the rotary arm 34 will be unbalanced. As a result, without a counterbalance system, the LNR device would be unbalanced as it spins up to the desired angular launch velocity. Alternatively, if the rotary arm 34 were balanced prior to payload release, the rotary arm would become unbalanced after release.

Counterweight assemblies (48, 49) solve this problem by countering the payload load on the rotary arm 34 prior to launch and then balancing the load on the rotary arm after launch. The rotational inertias of each of the two counterweight assemblies are preferably equal. In addition, the counterweight assemblies should have a combined rotational inertia equal to the rotational inertia of the payload. That way, when both counterweights 50, 52 are positioned opposite the payload, the system will be balanced. Likewise, when chamber 35 is empty, if both counterweights 50, 52 are positioned on opposite sides of the main shaft (i.e., 180° from each other), the system will also be balanced.

Figure 15:
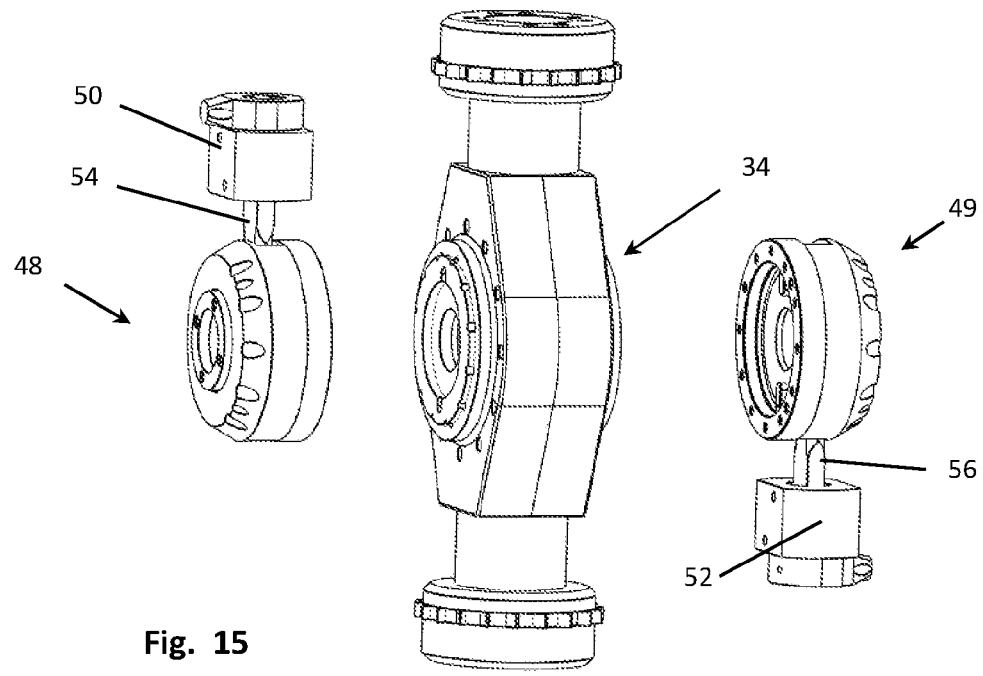
FIG. 15 is a perspective view with the counterbalance assemblies exploded from the rotary arm.
Figure 16:
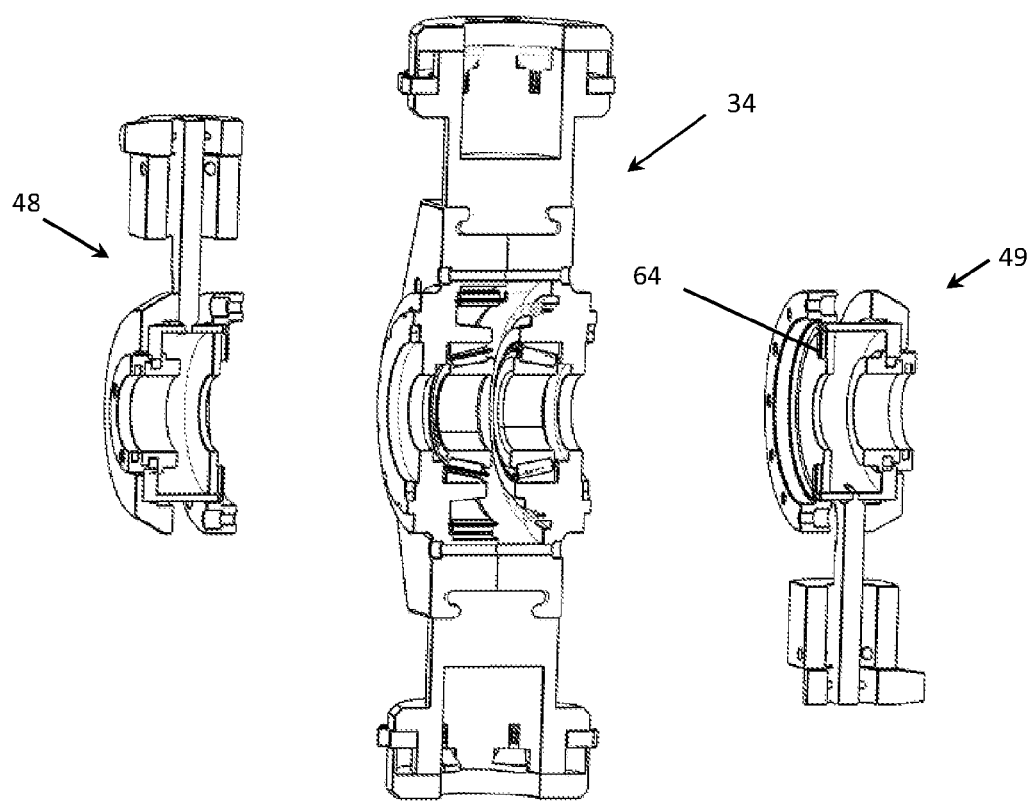
FIG. 16 illustrates a section view of FIG. 15.
Figure 17:
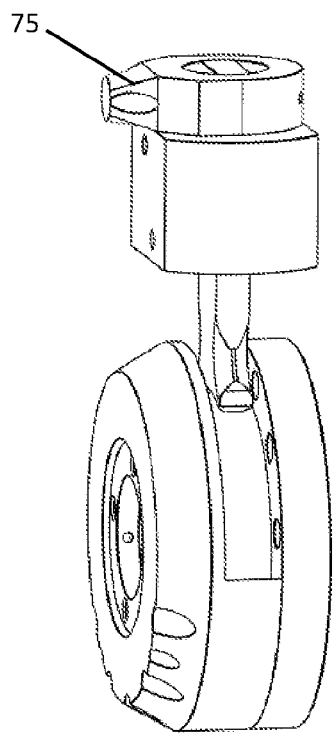
FIG. 17 is a perspective view of a counterbalance assembly.
Figure 18:
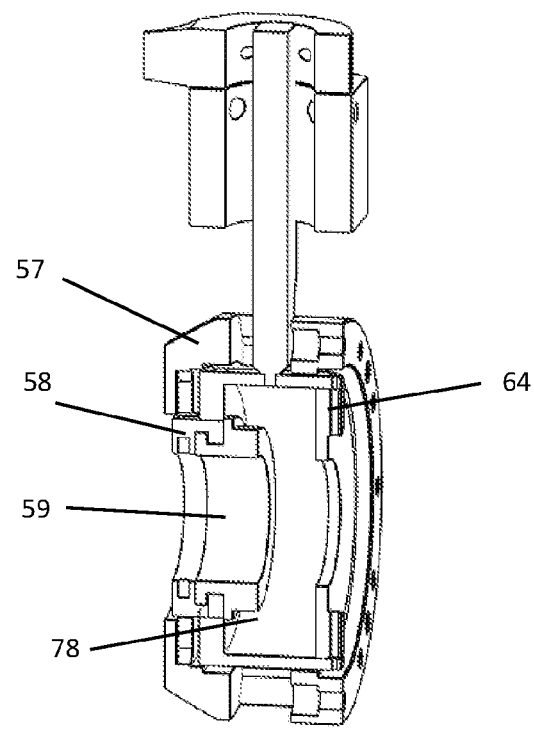
FIG. 18 illustrates a section view of FIG. 17.

The preferred counterweight assemblies (48, 49) are connected to the main shaft on opposite sides of rotary arm 34 as shown in FIG. 15. The first counterweight 50 is adjustably connected to the first counterweight arm 54. Likewise, the second counterweight 52 is adjustably connected to the second counterweight arm 56. Both counterweights (50, 52) should be adjustable along the length of each counterweight arm to enable the total inertia of each arm to be modified to suit the circumstances (e.g., differing payload weights). The adjustability can be accomplished in a variety of ways such as a threaded connection.

Figure 13:
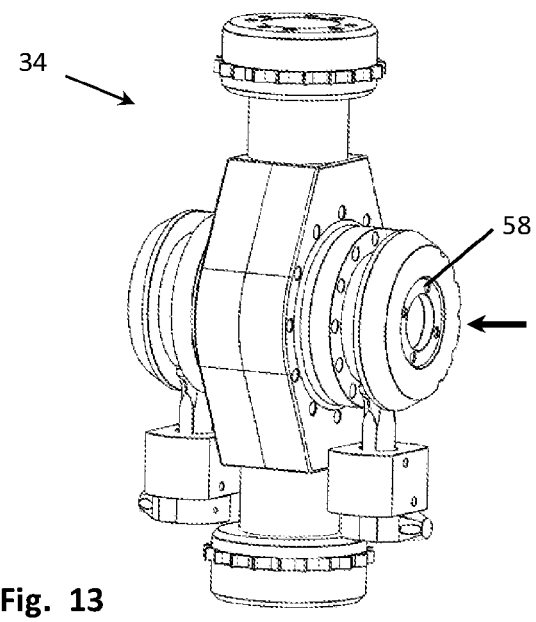

During spin-up and launch, the counterweight assemblies (48, 49) should be oriented on the same side of the main shaft as each other, but on the opposite side as the loaded chamber 35. See FIG. 13. In addition, the counterweight assemblies (48, 49) should be connected ("locked") to the rotary arm 34. In this state, the entire assembly (rotary arm, capsule, and two counterweight assemblies (48, 49)) are rotating on rotary arm bearings 37. This is called the first position.

Once capsule 25 is released from chamber 35, the rotary arm 34 becomes unbalanced because the release mechanism 43 no longer has a capsule in it; yet the other side still has both counterweight assemblies connected. To balance this condition, both counterweight assemblies (48, 49) first disengage from the rotary arm 34. Once both counterweight assemblies are disengaged, the rotary arm 34 is now in balance (but the system is not, see next paragraph). And the rotary arm is rotating on rotary arm bearings 37. The two counterweight assemblies (48, 49) are each free to rotate on their respective counterweight bearings at different rpms than the rotary arm. This is called the second position.

Figure 14:
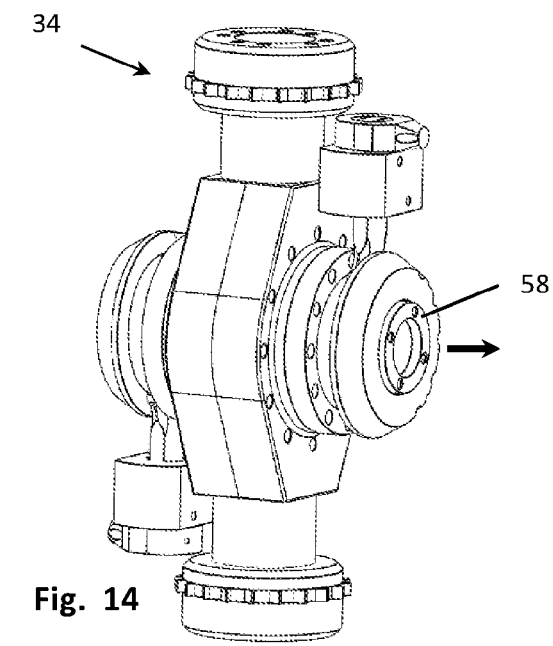
FIG. 14 is a perspective view of the rotary arm and counterbalance assemblies, with the counterbalance assemblies in position 3. Note button 58 pulled out.

Although rotary arm 34 is balanced in the second position, the counterweight assemblies (48, 49) are not because both counterweight assemblies (48, 49) are still on the same side relative to shaft 28. To bring the counterweight assemblies (48, 49) into balance, one counterweight assembly must rotate 180° relative to the other. Once this occurs, the counterweight assemblies (48, 49) will also be balanced. See, e.g., FIGS. 12, 14.

Again, position 1 refers to the position where the counterbalance assemblies 48, 49 are locked directly to the rotary arm 34. See FIG. 13. Position 2 is where the counterbalance assemblies 48, 49 are in neutral (disengaged from the rotary arm) and can spin about shaft 28 on their own bearings. Position 2 allows the counterbalance assemblies 48, 49 to change RPM (and position) relative to each other and relative to rotary arm 34. Position 3 refers to the position where the two counterbalance assemblies (48, 49) are relocked to the rotary arm 34 via outer hub 57 such that the rpm and angle of the counterbalance assemblies are fixed to the rotary arm. Position 3 occurs in at least two positions: 0° or 180°. For the purposes of this specification, positions 1 and 3 are referred to as a locked mode (or a locked position) and position 2 is referred to as a floating mode (or free mode).

Broadly, the preferred balancing process happens as follows:
1. Pre payload release: both counterbalances are in position 1.
2. Post payload release: both counterbalances are pulled to position 2.
3. One counterbalance assembly is pulled to position 3; Other counterbalance assembly magnet turns on and the counterbalance assembly begins to move 180° (relative to the rotary arm) as it has an angular velocity differential between it and the rotary arm.
4. Once the other counterbalance assembly reaches 180°, it is pulled to position 3.

Figure 20:
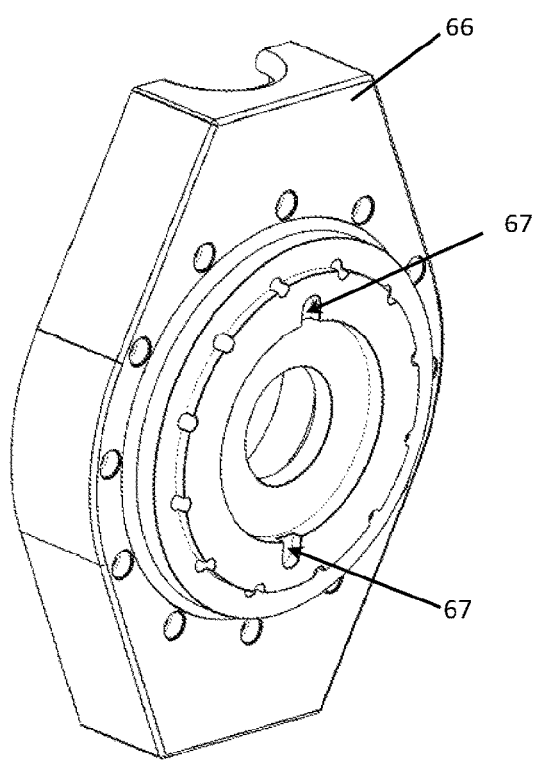
FIG. 20 is an outside face perspective view of a rotor hub embodiment.
Figure 21:
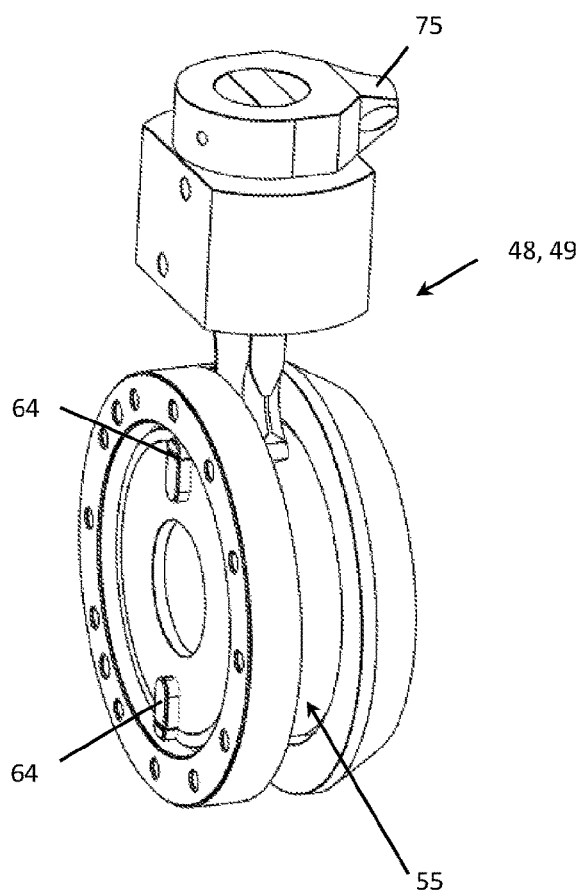
FIG. 21 is an inside face perspective view of a counterweight assembly embodiment.
Figure 22:
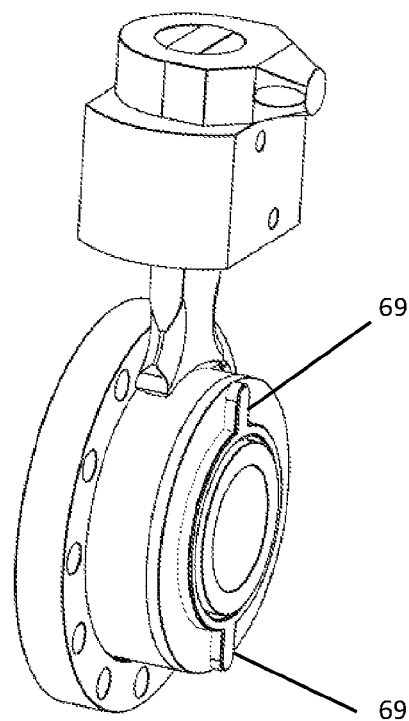
FIG. 22 is an outside face perspective view of a counterweight assembly embodiment with the outer hub removed.
Figure 23:
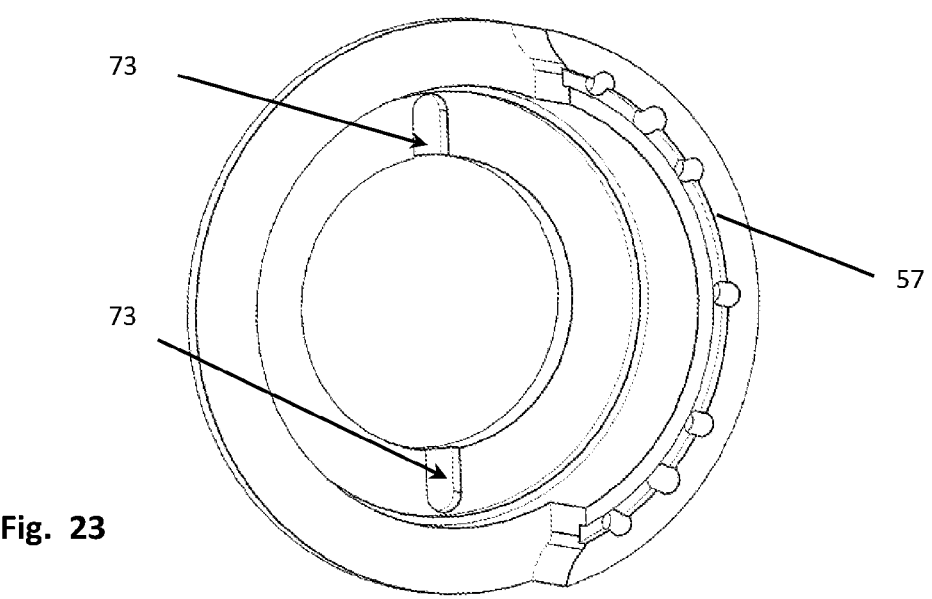
FIG. 23 is an inside face perspective view of a counterweight outer hub embodiment.
Figure 24:
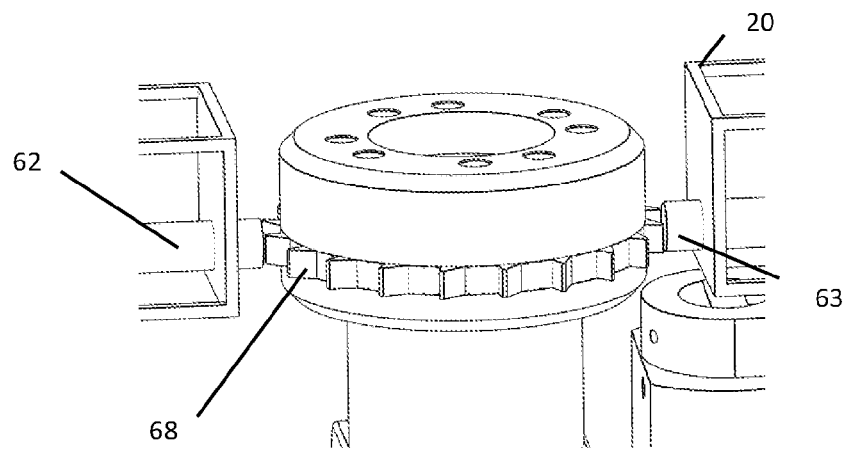
FIG. 24 is a perspective view of the magnetic actuator for an embodiment of the release mechanism.
Figure 25:
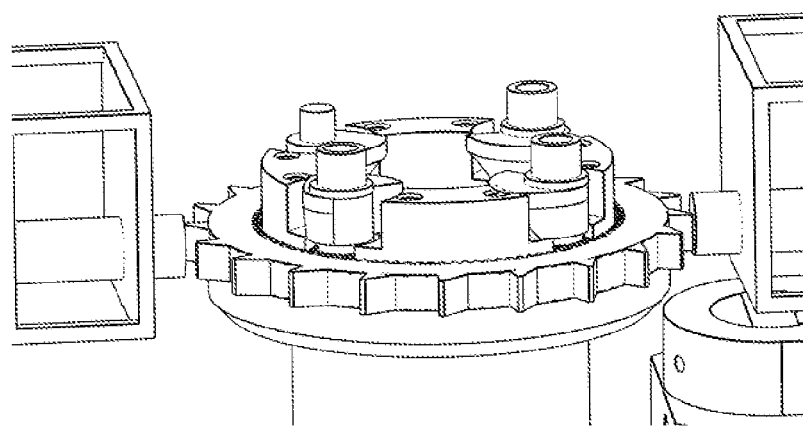
FIG. 25 is the perspective view of FIG. 24 with the spoke cover removed and the cams in the locked position.
Figure 26:
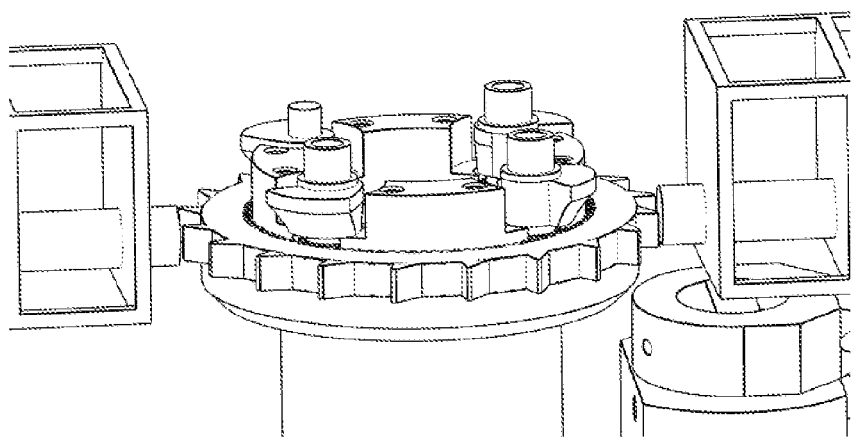
FIG. 26 is the perspective view of FIG. 24 with the spoke cover removed and the cams in the unlocked position.

Those in the art will recognize a variety of ways to move between locked mode and free mode. The preferred way to move between modes is to use a male/female key system. For example, as shown in FIGS. 20 and 21, an inside key 64 can be positioned on the counterweight assembly to engage an inside keyway 67 positioned on the rotor hub 66. Thus, when inside key 64 engages inside keyway 67, the counterbalance assembly is "locked" to the rotary arm 34 (position 1). Similarly, as shown in FIGS. 22 and 23, an outside key 69 can be positioned on the counterweight assembly to engage an outside keyway 73 positioned on the inside face of outer hub 57. Thus, when outside key 69 engages outside keyway 73, the counterbalance assembly is "locked" to outer hub 57 (position 3). In between position 1 and 3 is position 2, where the counterweight assembly is not engaged to either the rotary arm 34 or the outer hub 57.

Figure 19:
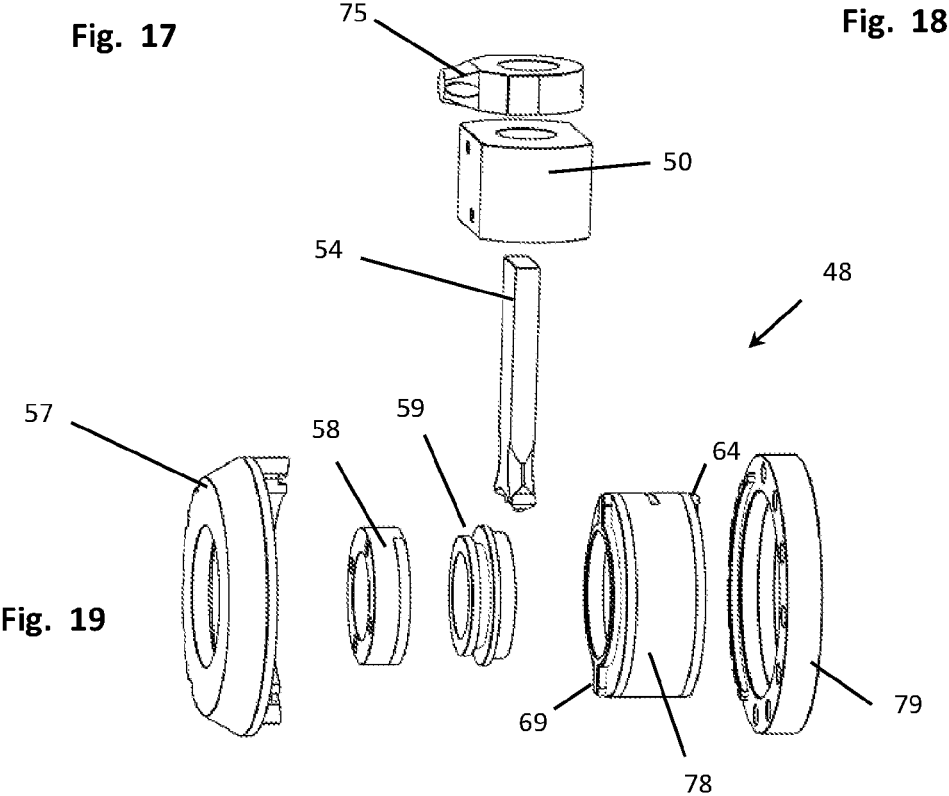
FIG. 19 is an exploded view of FIG. 17.

Turning to FIG. 19, the preferred counterweight assembly comprises the following parts the outer hub 57, a button 58, a thrust flange 59, a bearing housing 78 (comprising a bearing not shown), and an inner hub 79. The inner hub 79 is fixed to the rotor hub 66. And the outer hub 57 is fixed to the inner hub 79. The outer hub 57 preferably comprises a cutout section so that when outer hub 57 is connected to inner hub 66, slot 55 is formed. Bearing housing 78 slidably and rotatably fits inside the inner hub 79/outer hub 57 combination. Counterweight arms 54, 56 are connected to the bearing housing.

As shown in FIG. 21, slot 55 confines the movement of counterweight arms 54, 56. This means that when the counterweight assembly is in position 2, the counterweight is free to rotate relative to the rotary arm, but its rotational freedom is limited by slot 55.

Figure 12:
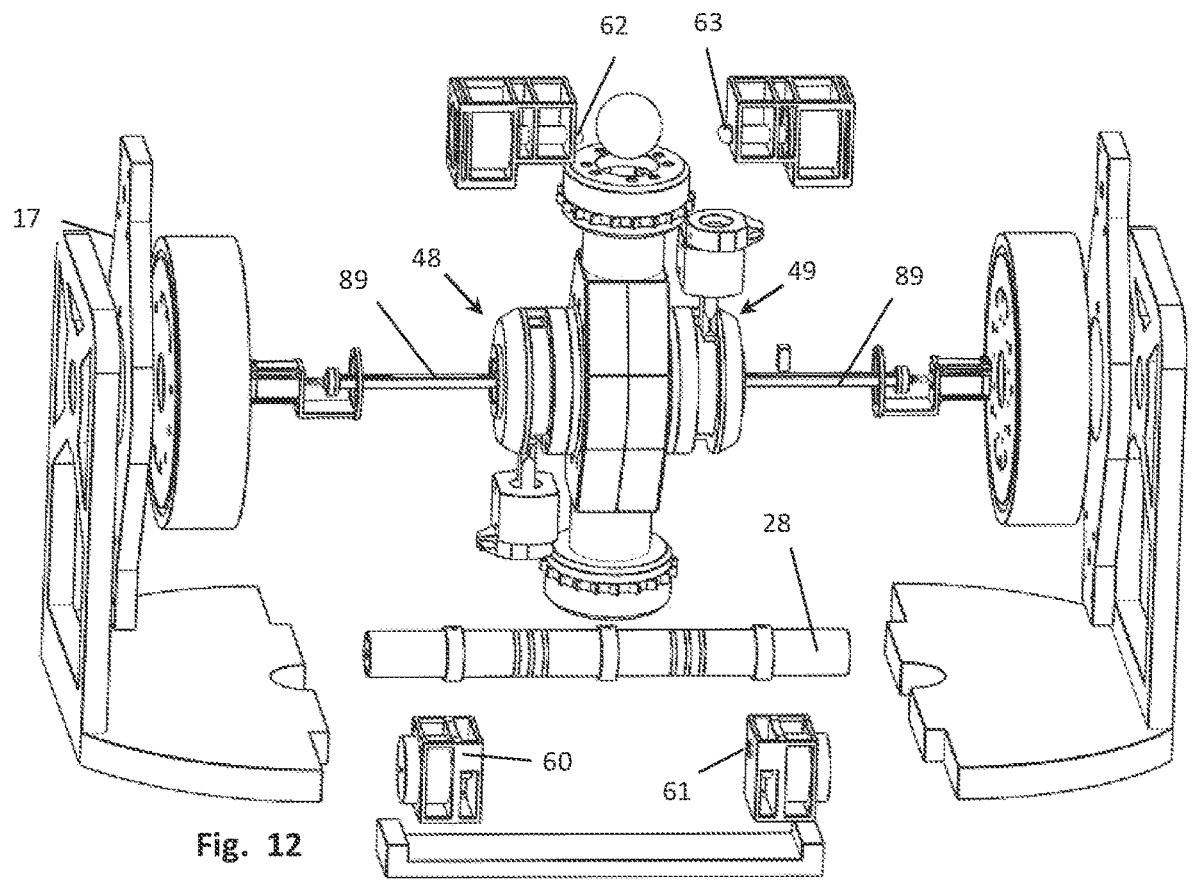
FIG. 12 is an exploded view of the embodiment shown in FIG. 3.

Stepper motors 88 move the counterweight assemblies (48, 49) between the first, second, and third positions via rods 89. As shown in FIG. 12, rods 89 connect the stepper motors 88 to the counterweight assemblies (48, 49). More specifically, rod 89 is connected to button 58. Button 58 is connected to thrust flange 59. And thrust flange 59 is engaged with bearing flange 78. In this configuration, stepper motor 88 linearly actuates rod 89 to push the inside key 64 into and out of the inside keyway 67. Likewise, stepper motor 88 linearly actuates rod 89 to pull outside key 69 into and out of the outside keyway 73.

To achieve position 1, stepper motor 88 pushes inside key 64 into inside keyway 67, which locks the counterweight assembly to the rotary arm 34. This is true for both counterweight assemblies (48, 49).

To achieve position 2, stepper motor 88 pulls inside key 64 out of inside slot 67, which permits the bearing flange 78/counterweight arm (54, 56) to rotate within slot 55. This is true for both counterweight assemblies (48, 49).

To go from position 2 to position 3, one of the two counterbalance electro-magnets 62, 63 gets switched on. When it does, the magnetic field begins to slow the rotation of the counterbalance assembly relative to the rotary arm 34. It is preferred to add a ferromagnetic ring 75 to the counterbalance assembly to facilitate the creation of a magnetic couple. The magnetic couple slows the rotation of the counterweight assembly as it passes by. This allows the rotary arm 34 to "catch up" to the counterbalance and enable the 180-degree adjustment. When the counterbalance assembly reaches 180° degrees relative to the rotary arm (that is the other end of slot 55), it stops. Stepper motor 88 pulls the outside key 69 into the outside keyway 73, locking it to the outer hub 57, which is locked to the rotary arm 34. This is position 3.

In the ordinary case, the other counterbalance does not rotate relative to the rotary arm 34. Instead, after the payload is released, the stepper motor 88 pulls bearing hub 68 directly into position 3. Once both counterbalance assemblies 48, 49 are in position 3 (but on opposite sides of each other), the system is again in balance. See, e.g., FIG. 12. The load from the two counterweights is on their respective bearings as the counterweight assemblies have detached from the rotary arm 34 post position 1.

Ultimately, each payload release involves three elements: the payload and two counterweights. Prior to launch, both counterweights oppose the payload. After launch, the counterbalance assemblies disengage from rotary arm 34, and one counterbalance is dragged to the other side to balance the system. The counterweights re-engage the rotary arm 34 when a new payload is loaded into the LNR.

Example: Launch Operation

First, a payload is loaded into the LNR chamber 35 of the first spoke 40 when the rotary arm 34 is vertical and in a down position. When a payload is in the chamber, both counterweight assemblies should be connected to the second spoke 47 (i.e., the two counterweights should be connected to the opposite spoke from the payload). Keys 64, mounted inside the counterbalance assemblies, keep the counterweight assemblies connected to the rotary arms. The inertia of the first spoke (with the payload) should be balanced with the inertia of the second spoke (with the pair of counterweight assemblies).

Next, a launch angle is selected. To do this, the control system rotates the bridge 17 to the desired launch angle. The motor 65 spins up the rotary arm 34 to the desired angular velocity, and the payload is ready to launch. The control system gives a launch signal and simultaneously turns on collar magnet 62. The rotary arm 34 continues to spin until the collar 68 is activated. Next, three actions coincide with each other: (1) the payload is released, (2) the first counterweight arm is released from the rotary arm (position 2), and (3) the second counterweight arm is released from the rotary arm (position 2). This allows the rotary arm to remain in balance. At this point, the first and second counterbalance arms have their respective counterweight force on each respective bearing. Next, one of the counterweight magnets 60, 61 turns on and begins to slow down one of the counterweight assemblies. The other counterweight assembly moves into position 3. Once the first counterweight rotates 180°, it also moves into position 3. Once one of the counterweight arms has switched sides, the counterbalance system is balanced, and the rotary arm can begin slowing down using its regenerative braking system.

Example Catch Operation

Prior to the catch, the rotary arm 34 should be balanced to minimize vibration during spin up. The preferred way to accomplish this is to "lock" the first counterweight assembly to the first spoke and "lock" the second counterweight assembly to the second spoke (position 3). In this orientation, both counterweight assemblies are connected to the main rotor via the rotary arm and are positioned on opposite sides on the rotary arm. In this orientation, the rotary arm is in balance prior to catch.

Next, motor 65 spins the rotary arm 34 until its tip velocity is parallel to that of the incoming payload. It is preferred that the tip of the rotary arm spins approximately 1% slower than the incoming payload so that the payload maintains contact with the rotary arm 34 after catch. This small speed differential helps mitigate destructive impacts and allows for a smoother catch.

When the inbound payload arrives, it contacts and pushes the rotary arm 34. Once contact is made, one of the counterweight assemblies should swing 180° to the other side of the rotary arm and keep it in balance. This is preferably accomplished by a magnet; this causes one counterbalance to be in motion to the opposite side as the payload pushes the rotary arm 34 in a circular motion. Post catch, both counterweights are side by side and directly opposite the payload, balancing the rotary arm 34.

Kinetic Energy Capture

When a payload is caught, its kinetic energy can be converted to electrical energy via regenerative braking. To do this, the rotary arm 34 can be directly attached to a DDM BLDC motor. The motor 65 preferably rides along a static shaft that is held in place by the receiving module. The motor itself spins, but the output shaft does not. This reduces the number of bearings required in the system, increasing efficiency, and decreasing wear-and-tear. This also allows us to mount momentum storage devices 94 that spin in the opposite direction to the rotary shaft. See FIG. 4.

As the arm spins from the payload's energy the motor spins. The motor slows the arm as it harvests its kinetic energy. For a 25 km 12 kg payload scenario (where the kinetic energy from the launch arm and the payload are harvested), the required input power is 697 kJ, but the net input power is only 325.7 kJ. The system efficiency revolves around the specific electrical components used, and the amount of inertia required for spin up and spin down relative to the payload weight.

A purely kinetic energy distribution system would mean that electrical energy is available only as kinetic energy is absorbed. This electrical energy would not be continuous and decrease as the arm slows. This would create a power spike that could be damaging to the operation that is expecting continuous power only and would necessitate a continuous flow of payloads, which is untenable. As such, it is preferred to enable a continuous power supply. While a variety of motors could be suitable, the preferred system uses a brushless DC motor that (when not electrically powered) generates electricity when spun; a 3-phase Rectifier connected to the DC motor that the power flows through; a converter that converts the oscillating power flow from the DC motor (changes with torque and RPM) to one continuous voltage. Likewise, a variety of batteries could be suitable, but a Li-ion battery that stores the electrical energy harvested from the motor can discharge as needed is preferred. This system enables the kinetic energy to be converted into electrical energy, stored, and subsequently output in a continuous flow. When the batteries are fully charged, extra energy can be dissipated as heat via resistor bank.

For a material distribution cycle, the system will spin up the DDM and launch a payload using electrical energy. The launch device can use regenerative braking to harvest the kinetic energy from the arm using the DDM. The launching rotary arm could eventually come to a complete stop. In the event material distribution is utilizing a network of LNR's that allow for material transfer 100 km using 4 LNR's where one LNR launches to the second LNR, which launches to the $3^{rd}$ etc. Instead of the middle LNR's spinning down their arms then rotating to aim at the next LNV in the chain then spinning back up, the arm can remain spinning, and the LNV can simply turn and aim at the desired operation then release the payload on its new heading.

The receiving device will spin up its catching arm using stored electrical energy. When the payload arrives, its kinetic energy will be converted into electrical energy, using regenerative braking, and stored onboard.

This table shows the pure mechanical energy required to spin up a 1.75-meter launch arm and payload. The estimated system electrical input power is 697.4 kJ. Using KE harvesting of the arm, only 409.2 KJ's would need to be added to the system for a launch. For a full cycle of payload launch, and payload catch where all KE is harvested only ~325 kJ is required to power the system.

| Projectile Weight (kg) | Service Range (km) | Launcher Mechanical Rotational Energy (kJ) | Electrical input Energy 1st Launch (kJ) | Electrical Net Energy Launch no Catch (kJ) | Electrical Net Energy Launch w/ Catch (kJ) |
|---|---|---|---|---|---|
| 12.0 | 25.0 | 583.9 | 697.4 | 409.2 | 325.7 |

Chassis

The catching device should possess the ability to move laterally and horizontally to account for payload drift. Mobility can be achieved by mounting the frames 17 to a chassis 14. Chassis 14 is optionally mounted on motorized wheels.

As shown in FIGS. 36-39, chassis 14 has three degrees of freedom (R1, R2, and X1). A first turntable 86 can be mounted on the chassis to create rotation shown as R1. The first turntable is preferably driven by a direct drive motor (DDM) and is mounted on rollers 89 that travel on a circular track. Linear track 90 supports the first turntable and creates the linear translation shown as X1. A second turntable 92 is connected below the linear track 90 and provides the rotation shown as R2. As shown, the preferred chassis 14 device can move as shown by R2, X1, and R1 control the origin of the launch position and the angle of launch.

To ensure maximum rigidity without unacceptable mass being included R1, X1, and R2 work in concert to adjust the receiving LNR system in real time to accommodate a non-perfect launch trajectory. First, the system will calculate the payload trajectory, then it will determine the arm's angular coordinates upon release. R1 will then rotate up to 180 degrees to allow for X1, the linear carriage, to be able to move to the needed location along its axis. Once X1 is in place R2 can rotate to allow the arm to be aligned for the oncoming catch. All 3 degrees of freedom can operate at the same time, ensuring the arm is in place by the time the payload arrives.

In addition, the chassis 14 provides a stable base for launching payloads by anchoring to the lunar surface. To promote stability, the LNR device preferably has wheels and spines that can be used to implant it into place during launch and catch operations. Then, once an operation has been concluded the LNR device can be driven to a new location or towed using tow bar by a rover or other vehicle. Further once moved to a new location an undercarriage can swing open and the rover can pack lunar rock onto the module to help weigh it down on the spines. Once ready to move, the module dumps the packed regolith and is ready for transportation.

Another option is adding a momentum storage device 94 in line with the rotary arm. See FIG. 3. The momentum storage device will accelerate in the opposite direction as the rotary arm, cancelling out the angular momentum that is generated from accelerating the rotary arm. Once the payload is released, the momentum storage device will act to counter the instantaneous angular momentum created within the system. The momentum storage device will then decelerate in tandem with the rotary arm. Once the rotary arm reaches zero RPM, the momentum storage device will have stored residual momentum. To bleed this momentum off into the lunar surface, the momentum storage device can slowly decelerate. This enhances the system's stabilization during launch and catch.

Ideally, once the vehicle is in position, the chassis lowers down. This lowers its center of gravity and creates support for the chassis—limiting vibration, bounce, movement. Flaps can then be folded down. Dirt, stone placed on or beside to pin down the chassis. If possible vertical or splayed rotary pins—stake to surface. Optionally legs can be deployed to add additional stability. The goal is to stabilize the outer hub so that it does not bounce or shake when in operation, which increases accuracy and repeatability.

Payload Design

The preferred payload 25 is designed as a sphere as it provides a symmetrical geometry for catch regardless of what type of spin is applied to the payload during launch. However, the payload shape can be any shape, disk, egg, cylinder etc., the launch system's release mechanism merely needs to be modified to account for the different shape. Different shapes work better with launch only operation since catch will have to be able to account for rotation changing the catch geometry. Further payloads don't need a payload depending on what they are, for example if a crashed space vehicle is being recycled the aluminum collected could be cast into the desired shape and volume then loaded into the SK system.

Spherical payloads can pass through the system with minimal actuation as it can be gravity fed. Once the payload is loaded, its center of gravity will affect its trajectory. The tangential velocity of the system will increase proportional to distance from the center of rotation. This means the payload will experience different tangential velocities when spun up to speed. The average velocity will occur at half of the payload's height. So, if the center of gravity (CG) does not correspond to the geometric center of the payload, then the payload velocity will vary. If there's any spin induced on the payload, it will rotate about its CG, causing precession. The preferred method of release imparts minimal spin, so this is less of a problem.

Payload CGs must be identified prior to launch to counteract any offsets. This can be done by spinning the payload about the 3 axes and monitoring the acceleration profile of the payload. Then, when the payload is loaded into an LNR, the CG can be rotated such that it aligns with the center of the payload with respect to the rotating arm. This can be done by adding a small magnet to the bottom of the payload relative to the CG. When the payload is loaded into the receiving arm, an electromagnet can "pull" the payload so that its "bottom" is in the proper plane. Then the release mechanism locks it into place.

Catch Mitigation

To mitigate launcher error, an optional embodiment featuring a net could be configured to catch a payload with 244 kJ of kinetic energy. To ensure that the net can withstand the force of a payload impact, it may be necessary to use materials with high tensile strength, such as high-strength fibers or steel cables. The net's surface area should be 10 m by 10 m, allowing for some error margin in the launch method. Additionally, the net should be designed with a sufficient safety factor to account for any unexpected variations in the ball's kinetic energy or trajectory.

To reduce the risk of net damage from multiple catches, it may be helpful to incorporate a multi-stage deceleration system. This could involve a series of nets with progressively decreasing amounts of slack, gradually decreasing the payload velocity as it passes through each net. By distributing the deceleration forces over a larger area, this approach could help reduce the risk of damage to the net.

Another optional embodiment is to design payloads to strike the lunar surface directly. This allows for transferring goods and specific payloads designed for high impacts into the Lunar surface. The launch mechanism would operate in the same way, except there would be no catch process. The first launch between two LNR's is the riskiest as positional information, and local space environment information has not been validated. To mitigate the risk of a failed catch two approaches can be taken. First a sacrificial capsule could be launched so that it intentionally misses the catching LNR. This allows the launcher and catcher to both monitor the capsule's trajectory and determine if it matches the model's output. This can continue until the model matches the trajectory of the capsule. Multiple launches to multiple locations can be done for quality assurance. Another method would be to use a smart capsule with built in propulsion that will assess its location in real time and make correction burns to make sure it reaches its target. It will take note of the changes it made to its flight and provide that data to update the LNR's respective models. Launch and catch will continue until the system is dialed in.

Although the invention has been described in detail with reference to one or more particular preferred embodiments, persons possessing ordinary skill in the art to which this invention pertains will appreciate that various modifications and enhancements may be made without departing from the spirit and scope of the claims that follow.

What is claimed is:

1. A device for launching and receiving a payload in a low-gravity environment, the device comprising:
    a shaft positioned along a central axis and connected between a pair of frames,
    a rotary arm connected to the shaft by roller bearings,
    the rotary arm comprising a first spoke and a first magnet-activated actuator on a first distal end, the first magnet-activated actuator positioned at a first radial distance from the shaft, and
    a bridge rotatably connected to the shaft, the bridge comprising a first magnetic element, the first magnetic element positioned on the bridge at the first radial distance from the shaft,
    wherein the device is configured to release a payload from the first distal end via actuation of the magnetic element.

2. The device of claim 1 further comprising a releasing mechanism positioned on the first distal end, the releasing mechanism comprising an open position and a closed position.

3. The device of claim 1 further comprising a second spoke, the second spoke comprising a concave surface on a second distal end.

4. The device of claim 1 further comprising a first counterbalance assembly connected to the shaft, the first counterbalance assembly comprising a counterbalance, a locked position and a free position, in the locked position the first counterbalance assembly is fixed to the rotary arm, in the free position, the counterbalance is not fixed to the rotary arm.

5. The device of claim 4 further comprising
    a second magnetic element connected to the bridge, the second magnetic element positioned at second radial distance from the shaft and configured to slow the rotation of the first counterbalance.

6. The device of claim 4 further comprising a second counterbalance assembly connected to the shaft.

7. The device of claim 1 further comprising a chassis, the pair of frames mounted to the chassis and the chassis comprising three degrees of freedom.

8. A device for launching and receiving a payload in a low-gravity environment, the device comprising:
    a shaft positioned along a central axis and connected between a pair of frames,
    a rotary arm connected to the shaft by roller bearings, the rotary arm comprising,
        a first spoke comprising a releasing mechanism, the releasing mechanism comprising an open position and a closed position,
        a second spoke comprising a concave surface on a second distal end, and
    a motor connected to the shaft, the motor configured to rotate the rotary arm about the shaft,
    wherein the device is configured to release a payload from the releasing mechanism.

9. The device of claim 8 further comprising
    a first magnet-activated actuator positioned on the rotary arm at a first radial distance from the shaft, and
    a rotary bridge connected to the shaft, the rotary bridge comprising a first magnetic element, positioned at the first radial distance from the shaft.

10. The device of claim 8 further comprising a first counterbalance assembly connected to the shaft, the first counterbalance assembly comprising a counterbalance, a locked position and a free position, in the locked position the first counterbalance assembly is fixed to the rotary arm, in the free position, the counterbalance is not fixed to the rotary arm.

11. The device of claim 10 further comprising
    a second magnetic element connected to the bridge, the second magnetic element positioned at second radial distance from the shaft and configured to slow the rotation of the first counterbalance.

12. The device of claim 8 further comprising a second counterbalance assembly connected to the shaft.

13. The device of claim 8 further comprising a chassis, the pair of frames mounted to the chassis and the chassis comprising three degrees of freedom.

14. A device for launching and receiving a payload in a low-gravity environment, the device comprising:
    a shaft positioned along a central axis and connected between a pair of frames,
    a rotary arm connected to the shaft by roller bearings,
    a motor connected to the shaft, the motor configured to rotate the rotary arm about the shaft, and
    a counterbalance connected to the shaft, the counterbalance comprising a locked position and a free position, in the locked position the counterbalance is fixed to the rotary arm, in the free position, the counterbalance is not fixed to the rotary arm.

15. The device of claim 14 further comprising a second counterbalance assembly connected to the shaft.

16. The device of claim 14 further comprising,
    a second magnetic element connected to the bridge, the second magnetic element positioned at second radial distance from the shaft and configured to slow the rotation of the first counterbalance.

17. The device of claim 14 further comprising
    a first spoke on the rotary arm the first spoke comprising a first magnet-activated actuator on a first distal end, the first magnet-activated actuator positioned at a first radial distance from the shaft, and
    a rotary bridge connected to the shaft, the rotary bridge comprising a first magnetic element, the first magnetic element positioned at the first radial distance from the shaft.

18. The device of claim 17 further comprising a releasing mechanism positioned on the first distal end, the releasing mechanism comprising an open position and a closed position.

19. The device of claim 17 further comprising a second spoke, the second spoke comprising a concave surface on a second distal end.

20. The device of claim 14 further comprising a chassis, the pair of frames mounted to the chassis and the chassis comprising three degrees of freedom.

* * * * *